United States Patent
Miyao

(10) Patent No.: US 9,210,069 B2
(45) Date of Patent: Dec. 8, 2015

(54) NETWORK OPERATION SYSTEM, NETWORK OPERATION METHOD AND NETWORK OPERATION PROGRAM

(75) Inventor: Yasuhiro Miyao, Tokyo (JP)

(73) Assignee: NEC Corporation, Tokyo (JP)

( * ) Notice: Subject to any disclaimer, the term of this patent is extended or adjusted under 35 U.S.C. 154(b) by 800 days.

(21) Appl. No.: 13/392,078

(22) PCT Filed: Aug. 19, 2010

(86) PCT No.: PCT/JP2010/063991
§ 371 (c)(1),
(2), (4) Date: Feb. 23, 2012

(87) PCT Pub. No.: WO2011/024702
PCT Pub. Date: Mar. 3, 2011

(65) Prior Publication Data
US 2012/0147786 A1    Jun. 14, 2012

(30) Foreign Application Priority Data

Aug. 26, 2009   (JP) ................................. 2009-195507

(51) Int. Cl.
*H04L 12/28* (2006.01)
*H04L 12/715* (2013.01)
(Continued)

(52) U.S. Cl.
CPC ................. *H04L 45/04* (2013.01); *H04L 12/18* (2013.01); *H04L 45/02* (2013.01); *H04L 45/22* (2013.01); *H04L 45/48* (2013.01)

(58) Field of Classification Search
CPC .......... H01L 12/18; H01L 45/22; H01L 45/48
USPC ................... 370/255, 408, 256, 238
See application file for complete search history.

(56) References Cited

U.S. PATENT DOCUMENTS

| 6,246,689 B1 * | 6/2001 | Shavitt ........................... 370/406 |
| 6,535,491 B2 * | 3/2003 | Gai et al. ....................... 370/256 |

(Continued)

FOREIGN PATENT DOCUMENTS

| JP | 2005-33715 A | 2/2005 |
| JP | 2008-546276 A | 12/2008 |

(Continued)

OTHER PUBLICATIONS

Y. Rekhter and T. Li, "A Border Gateway Protocol 4 (BGP-4)", RFC1771, Mar. 1995;(http://faqs.org/rfcs/rfc1771.html).

(Continued)

*Primary Examiner* — Ricky Ngo
*Assistant Examiner* — Dewanda Samuel
(74) *Attorney, Agent, or Firm* — McGinn IP Law Group, PLLC

(57) ABSTRACT

Data transfer with high throughput is enabled between servers. When in a set of sites each having a usable network operation unit, a new site is added or an existing site withdraws, designing is executed for determining a combination of the network operation units each one of which is to be used in each added or withdrawn site such that at least a site which transmits or receives data becomes reachable based on a connection relationship between each paired network operation units added or withdrawn, and when a combination of the network operation units is determined in the designing, the network operation unit determined is considered as a network operation unit to be newly used in each site.

9 Claims, 16 Drawing Sheets

(51) Int. Cl.
  *H04L 12/707* (2013.01)
  *H04L 12/18* (2006.01)
  *H04L 12/753* (2013.01)
  *H04L 12/751* (2013.01)

(56) References Cited

U.S. PATENT DOCUMENTS

| | | | | |
|---|---|---|---|---|
| 7,035,934 | B1* | 4/2006 | Lin | 709/238 |
| 7,103,651 | B2* | 9/2006 | Bohannon et al. | 709/223 |
| 7,139,242 | B2* | 11/2006 | Bays | 370/238 |
| 7,451,230 | B2* | 11/2008 | Corrado et al. | 709/238 |
| 7,626,948 | B1* | 12/2009 | Cook et al. | 370/256 |
| 7,693,071 | B2 | 4/2010 | Achlioptas et al. | |
| 8,078,181 | B2* | 12/2011 | Annunziato et al. | 455/446 |
| 8,155,126 | B1* | 4/2012 | Mao et al. | 370/397 |
| 8,503,336 | B2* | 8/2013 | Rappaport et al. | 370/277 |
| 8,520,556 | B2 | 8/2013 | Karuppiah et al. | |
| 8,521,904 | B1* | 8/2013 | Pei et al. | 709/238 |
| 9,026,654 | B2* | 5/2015 | Meloche et al. | 709/226 |
| 2006/0092862 | A1* | 5/2006 | Benedetto et al. | 370/256 |
| 2009/0274159 | A1* | 11/2009 | Xia et al. | 370/401 |

FOREIGN PATENT DOCUMENTS

WO   WO 2008/128564 A1   10/2008
WO   WO 2009/098748 A1   8/2009

OTHER PUBLICATIONS

Jon Baggaley, Batchuluun Batpurev, and Jim Klaas, "The World-Wide Inaccessible Web, Part 2: Internet Routes", The International Review of Research in Open and Distance Learning vol. 8, No. 2 (2007),( http://irrodl.org/index.php./irrodl/article/view/447/932).

J. Padhye, V. Firoiu, D. Towsley, J. Kurose, "Modeling TCP Throughput: A Simple Model and Its Empirical Validation", Proceedings of SIGCOMM 98, 1998(http://conferences.sigcomm.org/sigcomm/1998/tp/paper25.pdf).

Configuring Hierarchical Squid Caches (http://old.squid-cache.org/Doc/Hierarchy-Tutorial/tutorial-7.html).

Hayim Porat, Nurit Sprecher, and Zehavit Alon, "E-NNI Registration Protocol", (http://www.ieee802.org/1/files/public/docs2009/new-porat-E-NNI-Registration-protocol-0309-v03.pdf.), Mar. 2009.

English translation of Japanese Office Action dated May 13, 2014.

International Search Report in PCT/JP2010/063991 dated Sep. 14, 2010 (English Translation Thereof).

Y. Rekhter and T. Li, "A Border Gateway Protocol 4 (BGP-4)", RFC1771, Mar. 1995; (http://faqs.org/rfcs/rfc1771.html).

Jon Baggaley, Batchuluun Batpurev, and Jim Klaas, "The World-Wide Inaccessible Web, Part 2: Internet Routes", The International Review of Research in Open and Distance Learning vol. 8, No. 2 (2007) (http://irrodl.org/index.php./irrodl/article/view/447/932).

J. Padhye, V. Firoiu, D. Towsley, J. Kurose, "Modeling TCP Throughput: A Simple Model and Its Empirical Validation", Proceedings of SIGCOMM 98, 1998 (http://conferences.sigcomm.org/sigcomm/1998/tp/paper25.pdf).

Robert Endre Tarjan, Data Structures and Network Algorithms, Society for Industrial Mathematics, Jan. 1, 1987.

Hayim Porat, Nurit Sprecher, and Zehavit Alon, "E-NNI Registration Protocol", (http://www.ieee802.org/1/files/public/docs2009/new-porat-E-NNI-Registration-protocol-0309-v03.pdf.).

Motohisa Konno, "Traffic o Jyunan ni Sossa suru BGP no Keiro Sentaku o Master", Nikkei Network, No. 87, Jun. 22, 2007, pp. 174 to 178.

Masaaki Yoneda, "Kawaru Internet no Kozo Provider Kan Setsuzoku ni Shin Rule", Nikkei Communication, No. 260, Dec. 15, 1997, pp. 146 to 155.

Kazuhiko Yamamoto et al., "Nippon Internet no AS eno Bunkatsu ni Tsuite", Information Processing Society of Japan Kenkyu Hokoku, 93-DPS-59-5, Jan. 29, 1993 (Jan. 20, 1993).

* cited by examiner

FIG. 5

| AS set | Max link length | # of links |
|---|---|---|
| ( 0,0,0,0 ) | 5768 | |
| ( 1,0,0,0 ) | 3212 | 5 |
| ( 1,1,0,0 ) | 4330 | |
| ( 1,1,1,0 ) | 5768 | |
| ( 0,0,0,1 ) | 5768 | |
| ( 1,0,0,1 ) | 3212 | 6 |
| ( 1,1,0,1 ) | 4330 | |
| ( 1,0,1,1 ) | 5768 | |
| ( 1,1,1,1 ) | 5768 | |

(TYO, HCM, JKT, MNL)
  TYO: AS2516=0, AS2914=1
  HCM: AS7643=0, AS18403=1
  JKT: AS4761=0, AS7713=1
  MNK: AS4775=0, AS6648=1

ADJACENT RELATIONSHIP
BETWEEN ASS (AS LINK)

NETWORK OPERATION SYSTEM 200

NETWORK OPERATION SYSTEM, NETWORK OPERATION METHOD AND NETWORK OPERATION PROGRAM

TECHNICAL FIELD

The present invention relates to a network operation system, a network operation method and a network operation program and, more particularly, a network operation system which accommodates a plurality of server sites or data centers, a network operation method and a network operation program.

BACKGROUND ART

In the Internet, data transfer is executed between sites located in a geographically distributed manner, and a volume of data transmitted and received between the respective sites has been increased in recent years. It is therefore demanded to transfer data at a high speed even its volume of data transfer is large.

Site here is assumed to represent a place where one or a plurality of application servers are disposed which are capable of processing or accumulating data as shown in FIG. 11, for example.

With reference to FIG. 11, application servers 1030a to 1030d of a site 1000 are connected to an edge router 1010 located for accessing ASs (Autonomous System) 1200a and 1200b provided by an ISP (Internet Service Provider) through a multilayer switch 1020.

The site 1000 is connected to an entire Internet 1100 through the AS 1200a and AS 1200b. As shown in FIG. 11, form which allows use of ASs provided by a plurality of ISPs is referred to as multihoming.

It is assumed that at least one of application servers 1030a to 1030d should be provided and the number of the same is not limited.

Specific method of identifying such a site disposed in a geographically distributed manner as described above is an identification method on a city or nation basis, for example.

Site installation form ranges from small-size installation in which a server machine stored in a rack is disposed on a floor in a building to an Internet data center (iDC) which exclusively accommodates groups of a large number of server machines.

Specific example of high-speed data transfer between respective sites disposed in a geographically distributed manner is copying of data from a Web site issued from a contents holder or a site which hosts contents data such as moving image (also called as an origin site) to an edge site which executes delivery to an end user in a CDN (Contents Delivery Network).

Another example in a CDN is, when an edge site accessed by a contents user fails to cache contents which are desired by the contents user and whose time limit is yet to come, to transfer contents data from the above-described origin site to the edge site.

A further example is to transfer data which is dynamically generated by an origin site and which cannot be originally cached from the origin site to an edge site accessed by an end user.

In these examples, transferring data from an origin site to an edge site at a high-speed enhances bodily sensation and satisfaction of an end user.

In the Internet, when transferring data between respective sites disposed in a geographically distributed manner, it is crucial to select an optimum transfer path in order to execute high-speed data transfer.

In the past related art, however, a functionally optimum path cannot be always selected.

In the following, description will be made in order with respect to data transfer between respective sites disposed in a geographically distributed manner according to related art.

First, the Internet is structured with ASs each as a unit of a network (network operation unit) operated by an ISP, a major portal provider or the like connected with each other.

AS is a set of individual routers or end systems and has a unique number in the world allotted.

Each AS exchanges path information based on a row of AS numbers reachable to a certain IP (Internet Protocol) address prefix by using a path control protocol called BGP (Border Gateway Protocol). IP address prefix represents a set of IP addresses whose numbers are sequential.

Each AS also generates a transfer table indicating a hop (which is represented by an IP address applied to a network interface of a router or a server) to be transferred next to a certain IP address prefix based on received path information.

Connection between ASs is contracted for and executed according to business decision by an individual operator, and a form of connection between ASs mainly includes peering and transit.

Peering is connecting ASs and exchanging traffic with each other by ISPs under equal conditions. Peering enables transmission and reception basically free of charge premised on exchange of the same volume of traffic with each other.

Also in peering, each notifies the other of a group of addresses reachable to its own subordinate.

On the other hand, transit represents packet relay service provided by a certain ISP to other company in the same industry or the like. In transit, an ISP which provides packet relay service guarantees, to a customer (other company in the same industry etc.) which receives supply of the packet relay service, reachability of a packet to the entire Internet and is paid a fee from the customer according to a volume of traffic transferred between the two parties.

At present, accumulated connection relationships between ASs by the above-described peering, transit or the like establish a layered structure between operators such as Tier 1 and Tier 2 in the Internet.

Connection relationship between ASs established by peering, transit or the like gives heavy constraints on how a route between two points in the Internet is made.

In a case, for example, where a packet received by a certain AS from an AS of a peering partner is transferred to a higher AS as a provider of a transit, where a packet received from a higher AS is transferred to an AS of a peering partner or where data received from a peering partner is further sent to another peering partner, it will be considered that a packet is in practice transferred free of charge.

In order to solve the problem, a management entity of an AS usually exchanges path information by BGP according to a policy shown in the following. More specifically, the management entity of the AS notifies, to a peering partner or a provider of a transit, a path that can reach inside its own AS or in a case where itself is a transit provider, notifies only a path of its customer.

As a result, a path between two points by BGP is not always a functionally optimized path. More specifically, the number of hops of a router on a path between certain two points is not always the smallest.

For example, FIG. 12 shows a condition for transferring data from a site X using an AS1 to a site Y using an AS3. Specific example where a certain site uses a certain AS is that the site subscribes to an ISP which operates the AS.

Although a path having the smallest number of hops between the site X and the site Y is AS1→AS4→AS2→AS5→AS3, when each AS exchanges path information according to the above-described policy of exchanging path information, a selected path will be AS1→AS4→AS6→AS8→AS9→AS7→AS5→AS3 whose path length will be longer than the shortest path.

Actual example where a path length will be longer than the shortest path is shown in FIG. 3 of Non-Patent Literature 2, for example.

Shown in FIG. 3 of Non-Patent Literature 2 is a state where even between relatively close points in terms of geography, in such an area as Southeast Asia where connection between ASs by Internet Exchange or the like is not fully provided, packets are transferred via each of European and American Continents. Passing through different continents involves a large propagation delay.

Between ASs of ISPs actually having a contract for peering or transit, a path is not always notified by BGP all the time. In other words, whether to actually use a connection relationship for peering or transit might change depending on a policy of each ISP of its own. Furthermore, a contract between ISPs related to connection might be newly generated or end in some cases.

Hereinafter, a connection relationship is assumed to represent not a contract but a connection relationship which enables actual data transfer by transmission and reception of BGP.

While the foregoing is the description of data transfer according to related art between sites disposed in a geographically distributed manner, transferring data without error is an important factor in data transfer.

Therefore, used in the Internet is a TCP (Transmission Control Protocol) for transferring data of an application such as an HTTP (Hyper Text Transfer Protocol) between end systems such as a server machine or a PC of an end user without error.

In TCP, data is transferred without error by receiving and processing a response of reception confirmation of data transmitted.

Throughput at the time of data transfer by TCP depends on RTT (Round Trip Time) equivalent to a delay caused in a to-and-fro of transmission and reception or on a packet loss rate. One example is shown in Non-Patent Literature 3.

RTT includes a to-and-fro propagation delay between transmission and reception, a protocol processing delay of a packet in a device at the time of to-and-fro, a delay in transfer onto a line and the like. In a to-and-fro between transmission and reception, the same path is not always used in out-bound and in-bound.

In general, when the number of hops on the Internet is increased between transmission and reception, a packet loss rate is increased. When a link between ASs by a submarine cable connecting different continents or islands is included, RTT will be increased by a propagation delay.

An increase in a packet loss rate or an increase in RTT will decrease throughput at the time of data transfer by TCP.

Reference literatures for the above description are Non-Patent Literature 1, Literature 2 and Literature 3:

Non-Patent Literature 1: Y. Rekhter and T. Li, "A Border Gateway Protocol 4 (BGP-4)", RFC1771, March 1995;

Non-Patent Literature 2: Jon Baggaley, Batchuluun Batpurev, and Jim Klaas, "The World-Wide Inaccessible Web, Part 2: Internet Routes", The International Review of Research in Open and Distance Learning Vol. 8, No. 2 (2007);

Non-Patent Literature 3: J. Padhye, V. Firoiu, D. Towsley, J. Kurose, "Modeling TCP Throughput: A Simple Model and Its Empirical Validation", Proceedings of SIGCOMM 98, 1998;

Non-Patent Literature 4: Robert Endre Tarjan, Data Structures and Network Algorithms, Society for Industrial Mathematics, Jan. 1, 1987;

Non-Patent Literature 5: Configuring Hierarchical Squid Caches (http://old.squid-cache.org/Doc/Hierarchy-Tutorial/tutorial-7.html); and Non-Patent Literature 6: Hayim Porat, Nurit Sprecher, and Zehavit Alon, "E-NNI Registration Protocol", http://www.ieee802.org/1/files/public/docs2009/new-porat-E-NNI-Registration-protocol-0309-v03.pdf.

In the above-described data transfer between respective sites disposed in a geographically distributed manner according to the related art, when each site independently selects and uses one usable AS from among one or a plurality of ASs, throughput in data transfer might not be improved in some cases.

The reason is that when transferring data from a certain site to another site, if there exists no connection between ASs used by the respective sites, more ASs will be involved in a path between the sites to increase the number of hops on a router basis as shown in FIG. 12, resulting in inviting an increase in RTT or packet loss opportunities to worsen throughput of TCP in some cases.

OBJECT OF THE INVENTION

An object of the present invention is to provide a network operation system, a network operation method and a network operation program which enable operation of a network that allows data transfer with high throughput between servers.

SUMMARY

According to a first exemplary aspect of the invention, a network operation method, includes when in a set of sites each having a usable network operation unit, a new site is added or an existing site withdraws, executing designing for determining a combination of network operation units each one of which is to be used in each the added or withdrawn site such that at least a site which transmits or receives data becomes reachable based on a connection relationship between each paired the network operation units added or withdrawn, and when a combination of the network operation units is determined in the designing, considering the network operation unit determined as a network operation unit to be newly used in each the site.

According to a second exemplary aspect of the invention, a network operation system, includes a designing server which executes, when in a set of sites each having a usable network operation unit, a new site is added or an existing site withdraws, designing for determining a combination of network operation units each one of which is to be used in each the added or withdrawn site such that at least a site which transmits or receives data becomes reachable based on a connection relationship between each paired the network operation units added or withdrawn, and an operation server which considers, when a combination of the network operation units is determined in the designing, the network operation unit determined as a network operation unit to be newly used in each the site.

According to a third exemplary aspect of the invention, a program which causes a computer as a designing server to execute the processing of executing, when in a set of sites each having a usable network operation unit, a new site is added or an existing site withdraws, designing for determining a combination of the network operation units each one of which is to be used by each the added or withdrawn site such that at least a site which transmits or receives data becomes reachable based on a connection relationship between each paired the network operation units added or withdrawn, and causes a computer as an operation server to execute the processing of considering, when a combination of the network operation units is determined in the designing, the network operation unit determined as a network operation unit to be newly used in each the site.

The present invention enables a combination of optimum network operation units to be appropriately re-designed which allows data transfer with high throughput, thereby enabling a network operation which allows data transfer with higher throughput between servers.

BRIEF DESCRIPTION OF THE DRAWINGS

FIG. 5 is a diagram showing a specific example of operation of the designing server according to the first exemplary embodiment of the present invention;

EXEMPLARY EMBODIMENT

Next, exemplary embodiments of the present invention will be described in detail with reference to the drawings.

First Exemplary Embodiment

Figure 14:
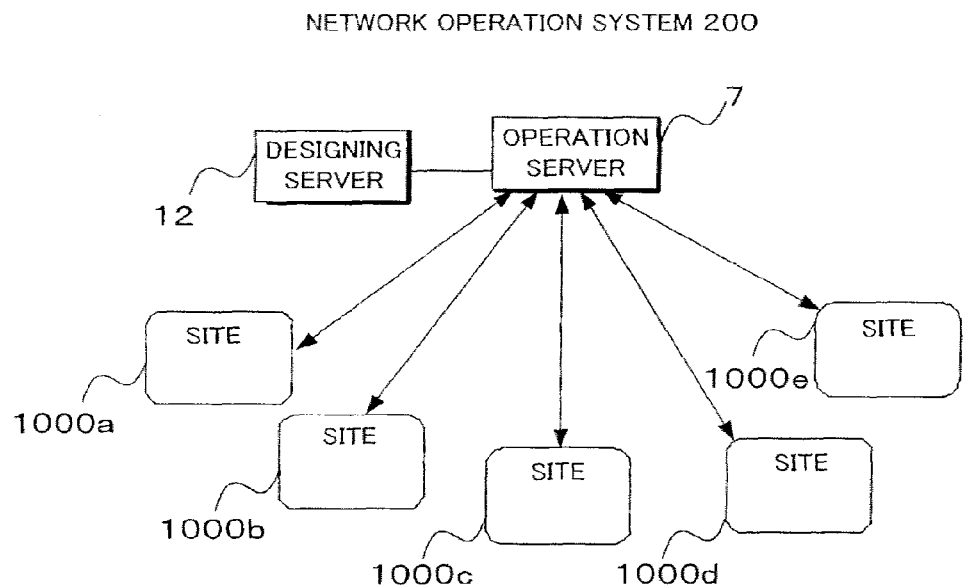
FIG. 14 is a diagram showing an entire structure of a network operation system according to the first exemplary embodiment of the present invention.

FIG. 14 is a diagram showing a structure of a network operation system according to a present exemplary embodiment.

With reference to FIG. 14, a network operation system 200 according to the present exemplary embodiment includes an operation server 7, a designing server 12 and sites 1000a to 1000e.

The operation server 7 appropriately collects information from the plurality of sites 1000 in the network and when a change occurs in the number of sites or an AS connection relationship, provides information of the change to the designing server 12.

Although the present exemplary embodiment will be described with respect to a case of a structure having five sites 1000a to 1000e as the site 1000 for the sake of explanation, the number of sites is assumed not to be limited.

When an evaluation value is improved according to a combination of ASs each to be used by each site which is indicated by design information provided by the designing server 12, the operation server 7 changes an AS to be used by each site according to the design information. Specific structure and evaluation value of the operation server 7 will be described later.

Upon receiving information of a change in the number of sites or an AS connection relationship from the operation server 7, the designing server 12 designs a combination of ASs to be used by the respective sites in the received information and provides the operation server 7 with the design information.

Figure 11:
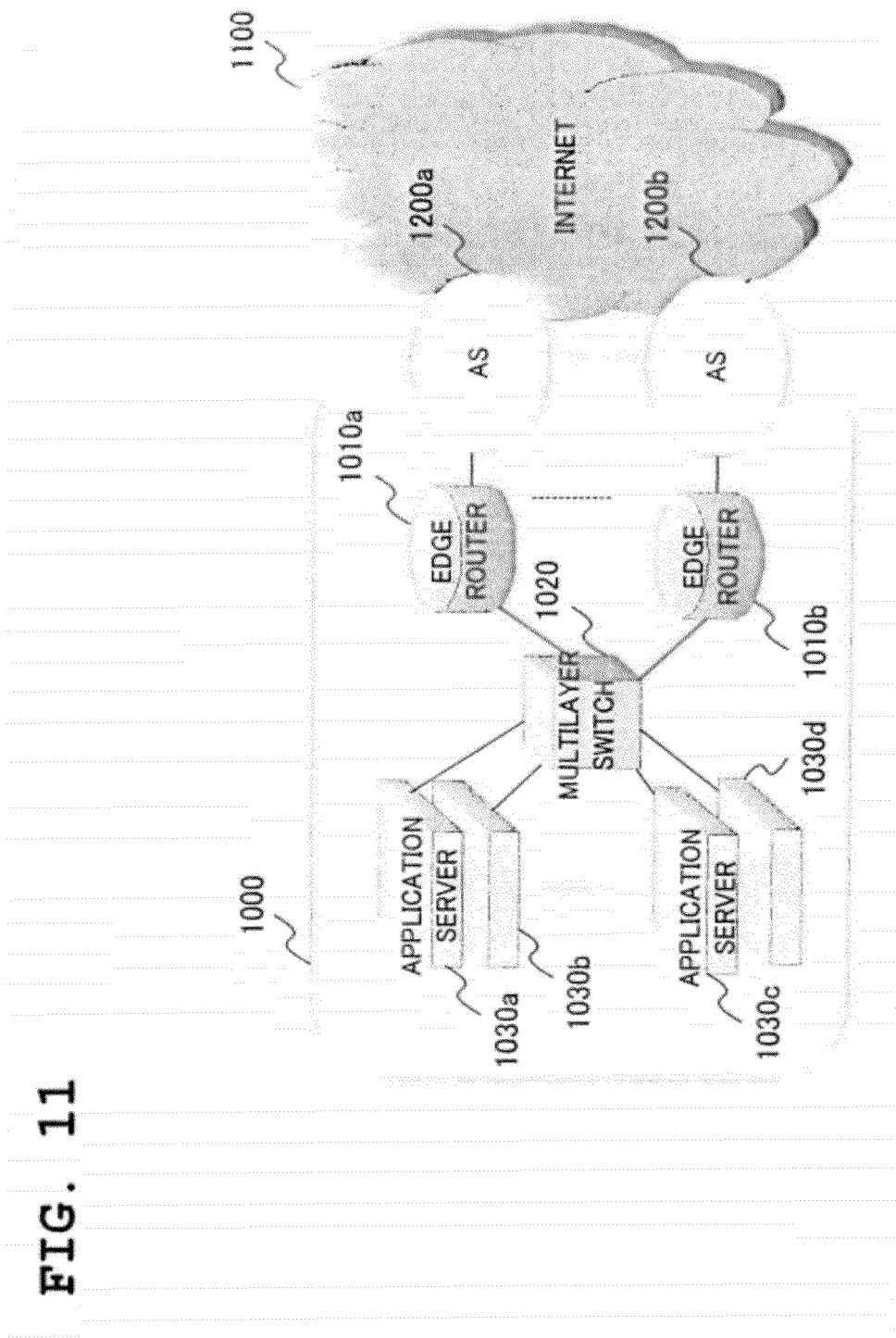
FIG. 11 is a diagram showing a structure of a site according to the first exemplary embodiment of the present invention.
Figure 12:
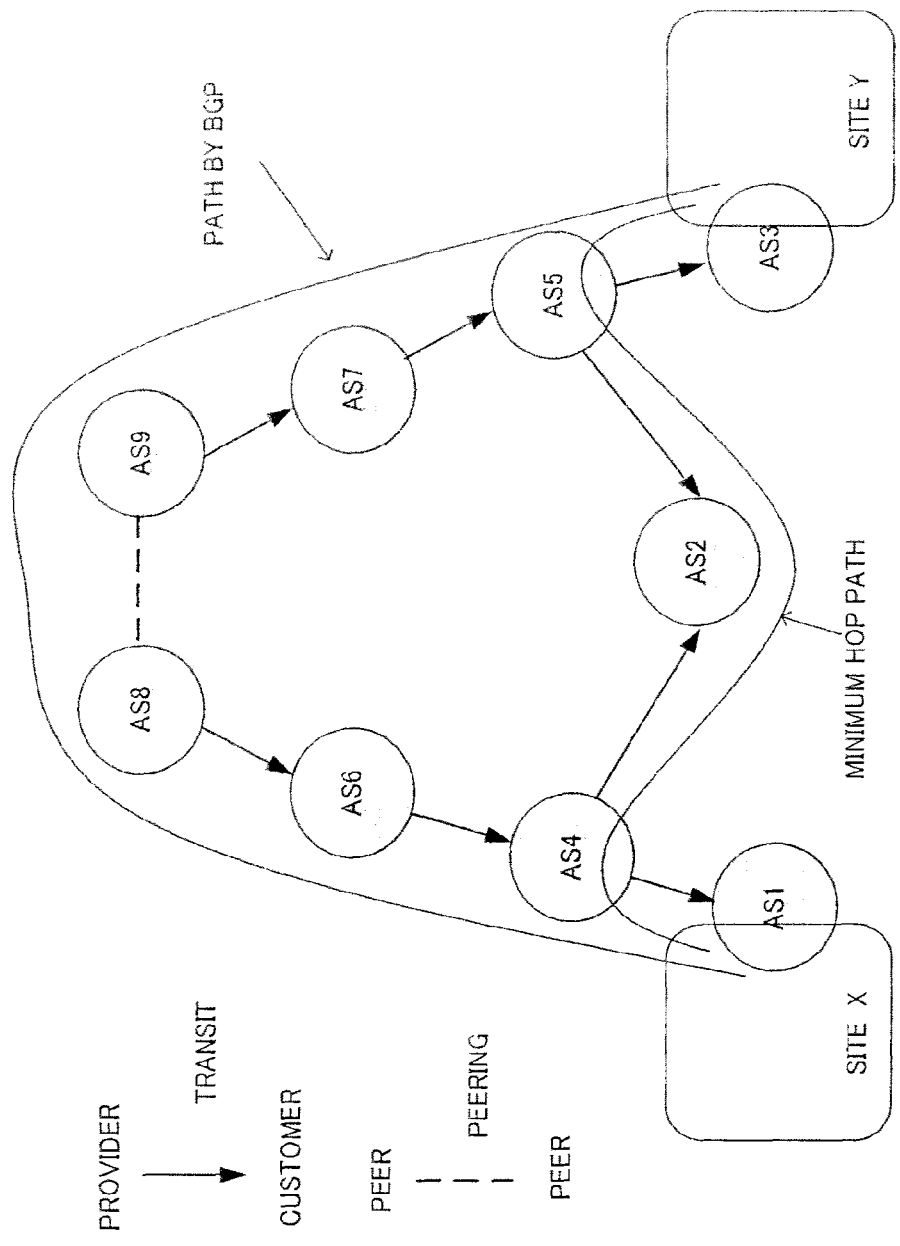
FIG. 12 is a diagram for use in explaining routing hierarchy in the Internet.

With reference to FIG. 11 here, a structure of a site 1000 is shown.

In each site 1000, connection service of a plurality of ISPs can be appropriately selected and used.

When the site 1000 uses connection service of a certain ISP, for example, data will be transferred through an edge router 1010 leading to its AS 1200. An AS leading to the edge router 1010 is a usable AS.

In specific description with reference to FIG. 11, when the site 1000 wants to use connection service of an ISP which provides an AS 1200a, data will be transferred through an edge router 1010a leading to the AS 1200a.

An application server 1030 executes data transmission, reception or relay cashing in a case of HTTP). A multilayer switch 1020 accommodates the edge router 1010 and the application server 1030 to transfer data between different application servers in the site or between the application server 1030 and the edge router 1010.

A combination of ASs each one to be used by each of the sites 1000a to 1000e shown in FIG. 14 has its setting changed as required in order to improve throughput of the above-described data transfer.

More specifically, designing is executed to try to determine such a combination of ASs as optimizes an objective function applied by the designing server 7 under a condition where a connection relationship applied to each pair of ASs between different sites realizes reachability.

Then, when an optimum AS combination is obtained, the operation server 7 sets the application server 1030 and the multiplayer switch 1020 in the site as required.

Depending on a connection relationship between ASs, there might occur a case where no combination of ASs that satisfies the above-described condition is obtained, that is, where an AS graph including all the sites cannot be linked and in such a case, impossible designing is notified to an operator through an output device 4.

Information to be applied at the time of designing for trying to determine an AS combination includes, as to certain data service, a set of sites in a range related to the data service, an AS usable by each site, existence/non-existence of a connection relationship between each paired ASs and when a connection relationship exists between ASs, a cost applied to the connection relationship.

Site in a range related to the data service here includes an origin site which generates data related to the data service and an edge site which causes delivery of data from the origin site to an end user.

In addition, other than sites those which transmit and receive data related to data service, a relay site which executes neither generation nor delivery of data but executes only relay of delivery data may be included in some cases.

Each data service, when provided on an HTTP basis, is discriminated by URL. There occurs a case where a certain site is included in a range related to a plurality of different data services.

It is assumed that a different application server 1030 is used for each data service.

The application server 1030 is actually a physical machine or a virtual machine realized in parallel with the same physical machine simultaneously.

Figure 15:
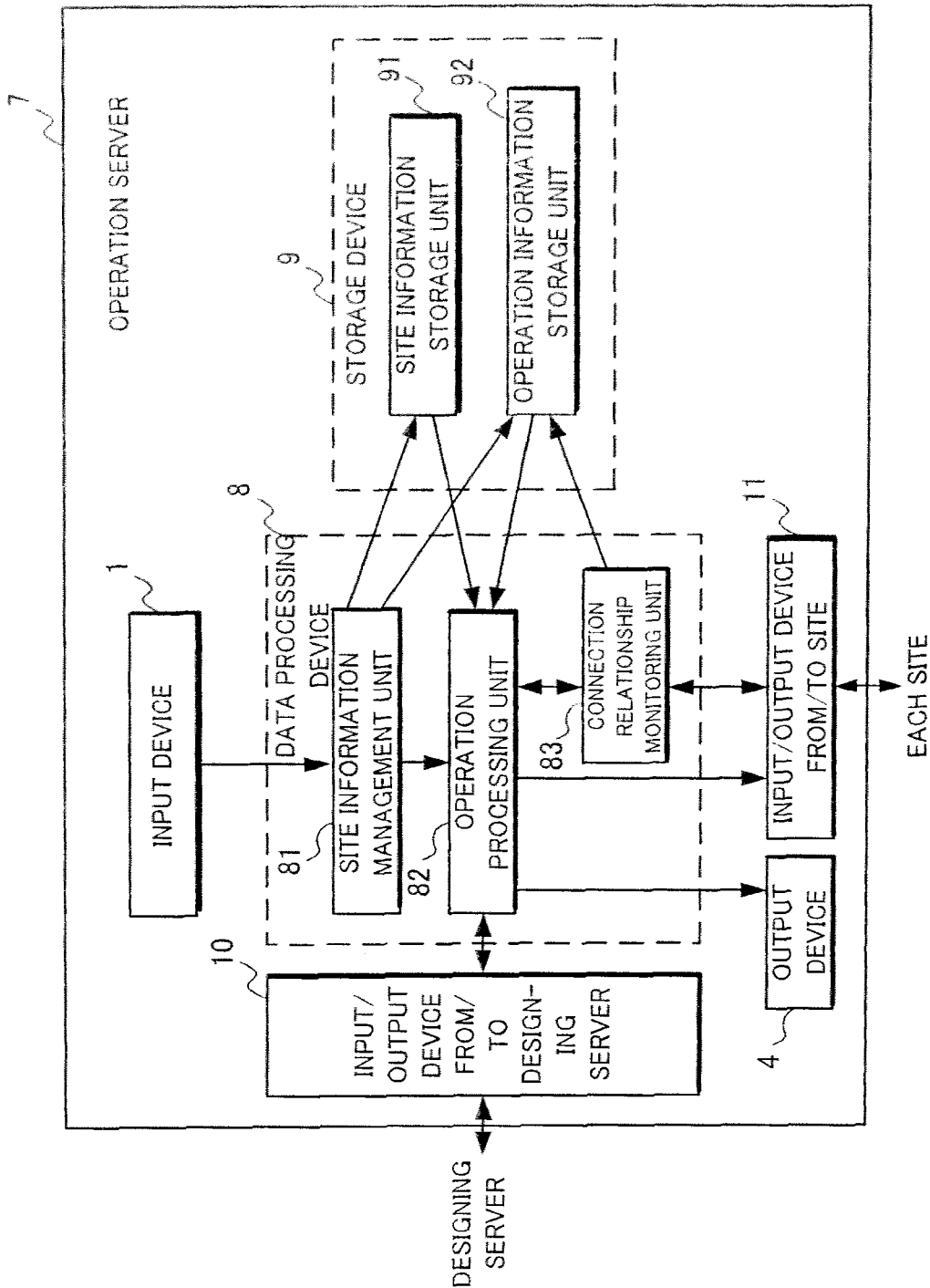
FIG. 15 is a diagram showing a structure of an operation server according to the first exemplary embodiment of the present invention.

Next, with reference to FIG. 15, a structure of the operation server 7 according to the present exemplary embodiment is shown.

The operation server 7 comprises an input device 1 such as a keyboard, a data processing device 8 operable under program-control, a storage device 9 which stores information, the output device 4 such as a display or a printing device, an input/output device 10 from/to a designing server and an input/output device 11 from/to a site.

The data processing device 8 includes a site information management unit 81, an operation processing unit 82 and a connection relationship monitoring unit 83.

The site information management unit 81 appropriately obtains information from the sites 1000a to 1000e through the input device 1 and when at least one site is added or withdrawn or an AS usable in a certain site is added or withdrawn, updates a site information storage unit 91 to notify the operation processing unit 82 of a change of site information.

When notified of a change of site information by the site information management unit 81 or notified of a change of a connection relationship between ASs from the connection relationship monitoring unit 83, the operation processing unit 82 takes out design information which will be described later from the site information storage unit 91 and an operation information storage unit 92 and sends the design information to the designing server 12 through the input/output device 10 from/to a designing server.

Upon receiving a design result from the designing server 12, the operation processing unit 82 executes setting for AS setting change at each site through the input/output device 11 from/to a site when necessary.

The connection relationship monitoring unit 83 refers to the operation information storage unit 92 to monitor whether a connection relationship changes or not between an AS usable in a certain site and an AS usable in other site.

Figure 17:
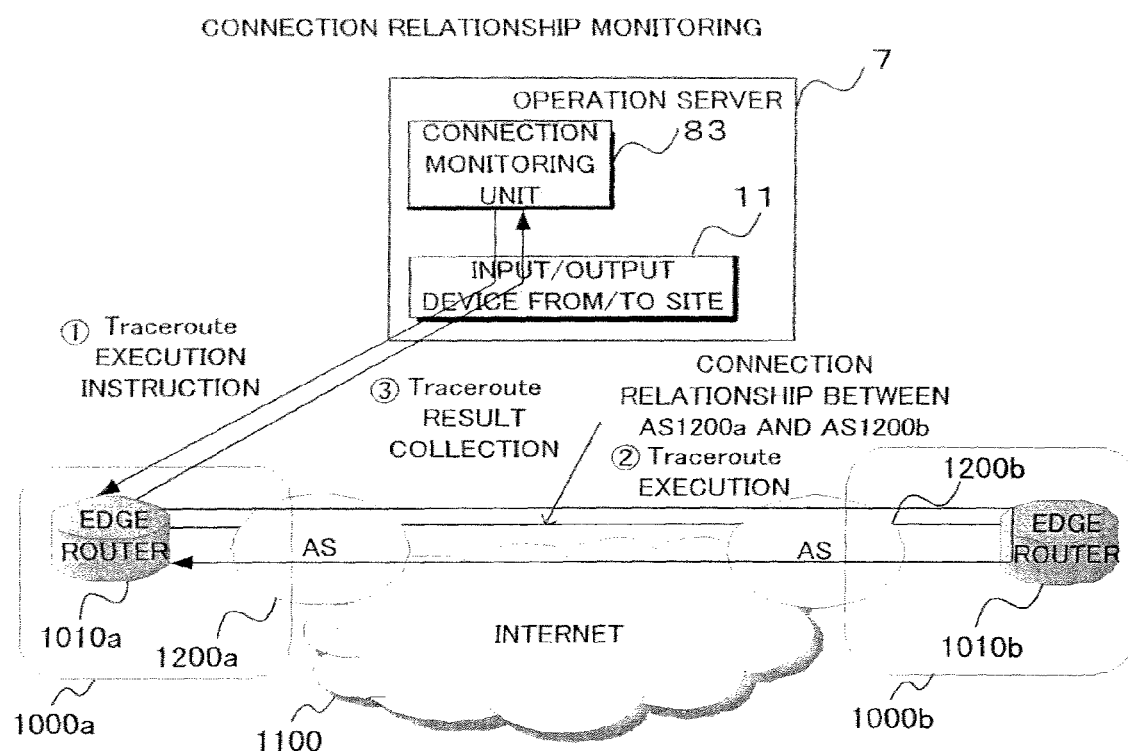
FIG. 17 is a diagram showing a structure and operation of connection relationship monitoring according to the first and second exemplary embodiments of the present invention.

More detailed operation is shown in FIG. 17. Assume now that the AS 1200a usable in the site 1000a and the AS 1200b usable in the site 1000b have a connection relationship.

The connection relationship monitoring unit 83 gives an instruction through the input/output device 11 from/to a site to the edge router 1010a which terminates the AS 1200a to execute traceroute directed to the edge router 1010b which terminates the AS 1200b and after the traceroute is executed from the edge router 1010a directed to the edge router 1010b, collects a result of the execution through the input/output device 11 from/to a site.

Then, when detecting an IP address included other than the AS 1200a and AS 1200b in the execution result, the unit 83 updates the operation information storage unit 92 to have no adjacent relationship between the paired AS 1200a and AS 1200b, as well as notifying the operation processing unit 82 that an adjacent relationship has a change between the ASs.

The storage unit 9 comprises the site information storage unit 91 and the operation information storage unit 92.

The site information storage unit 91 stores, as to certain service, information about a set of sites as a range related to the service and an AS usable by each site. The information is input from the input device 1 through the site information management unit 81.

The operation information storage unit 92 stores information related to an AS being used in each site and information related to existence/non-existence of a connection relationship between each paired ASs between different sites with respect to all the ASs usable in each site. The information is changed when the connection relationship monitoring unit 83 detects a change by monitoring.

Figure 1:
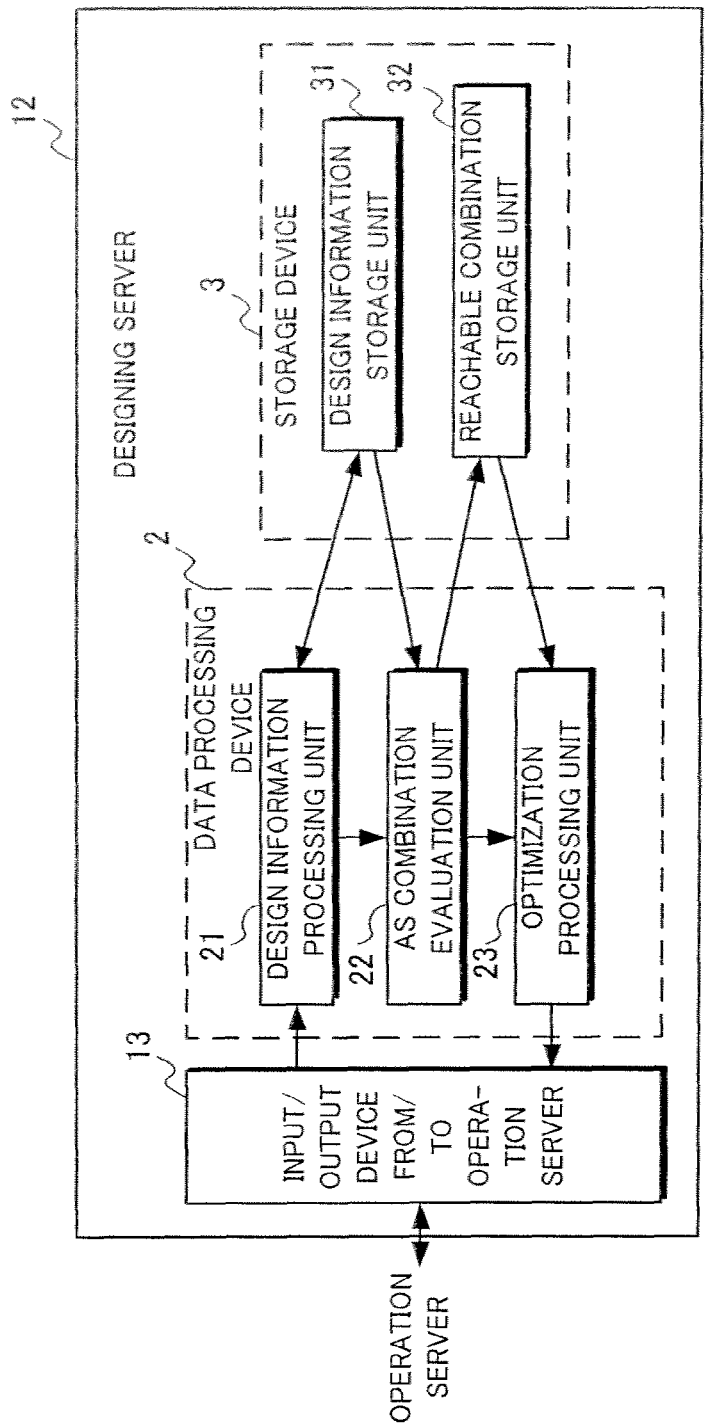
FIG. 1 is a block diagram showing a structure of a designing server according to a first exemplary embodiment of the present invention.

Next, with reference to FIG. 1, a structure of a designing server 12 according to the present exemplary embodiment is shown.

The designing server 12 includes an input/output device 13 from/to an operation server, a data processing device 2 operable under program-control and a storage device 3 which stores information.

The data processing device 2 comprises a design information processing unit 21, an AS combination evaluation unit 22 and an optimization processing unit 23.

The design information processing unit 21 executes processing of converting design information input through the input/output device 13 from/to an operation server into a form suitable to be handled at each unit of the data processing device 2 and storing the obtained information in a design information storage unit 31.

Design information here includes a set of sites, an AS usable by each site, existence/non-existence of an adjacent relationship between paired ASs between different sites, and when the connection relationship exists, cost (cost of an AS link) applied to the connection relationship in question.

The design information processing unit 21 starts the AS combination evaluation unit 22 after storing design information converted into a form suitable for handling in the design information storage unit 31.

The AS combination evaluation unit 22 refers to design information stored in the design information storage unit 31 to create, one by one, a combination of AS candidates each to be used by each site, as well as creating a minimum spanning tree corresponding to the combination by the Prim's algorithm based on cost applied between ASs connected with each other.

Cost applied between ASs here represents a distance between ASs connected with each other.

Minimum spanning tree represents a spanning tree in which "a total sum of weights of sides" forming a graph is the smallest and a graph represents a graph formed of a set of nodes and a set of edges (links).

Since the above-described minimum spanning tree, a spanning tree, a graph and the Prim's algorithm are well-known to those skilled in the art of the present invention and the method itself is not directly relevant to the present invention, no detailed description will be made thereof.

Connection between ASs will be referred to as an AS link and a graph represented by an AS link will be referred to as an AS graph.

The AS combination evaluation unit 22 determines from a created minimum spanning tree whether all the links between sites are reachable or not. Links between all the sites being reachable denotes whether a created minimum spanning tree includes all the sites included in design information.

More specifically, the AS combination evaluation unit 22 refers to design information stored in the design information storage unit 31 to determine whether the created minimum spanning tree includes all the sites included in the design information.

With respect to an AS candidate combination in which links between all sites are determined to be reachable, the AS combination evaluation unit 22 stores information related to at least the combination of AS candidates in question in a reachable combination storage unit 32.

More specifically, information related to an AS candidate combination represents information of an AS link forming a minimum spanning tree corresponding to a combination of AS candidates in which links between all the sites are determined to be reachable.

When the AS combination evaluation unit 22 completes the processing, if at least one AS candidate combination is stored in the reachable combination storage unit 32, the optimization processing unit 23 takes out information related to the AS candidate combination in question from the reachable combination storage unit 32. Then, as to combinations of all the AS candidates stored in the reachable combination storage unit 32, the optimization processing unit 23 evaluates an objective function to calculate an optimum AS combination of the AS candidates in question. Objective function represents a value or a function value which should be minimized or maximized in an optimization problem.

More specifically, the optimization processing unit 23 evaluates a maximum value of cost of an AS link forming a minimum spanning tree corresponding to a combination of AS candidates as an objective function to calculate an optimum AS combination in which a maximum value of cost of the AS link in question will be the smallest.

The optimization processing unit 23 also evaluates a total number of AS links forming the minimum spanning tree as an objective function to calculate an optimum AS combination in which the total number of AS links in question is the largest.

The optimization processing unit 23 also evaluates a total sum of costs of AS links forming the minimum spanning tree as an objective function to calculate an optimum AS combination in which the total sum of costs of the AS links in question is the smallest.

The optimization processing unit 23 also sends the calculated optimum AS combination to the operation server 7 through the input/output device 13 from/to an operation server as a combination of ASs to be newly used.

The storage device 3 comprises the design information storage unit 31 and the reachable combination storage unit 32.

Stored in the design information storage unit 31 is design information including a set of sites, an AS usable by each site, existence/non-existence of an adjacent relationship between paired ASs between different sites, and when the adjacent relationship exists, cost (cost of an AS link) applied to the connection relationship in question.

The reachable combination storage unit 32 stores an AS combination obtained by the AS combination evaluation unit 22 in which links between all sites are reachable and a value (evaluation value) of an objective function evaluated by the optimization processing unit 23 with respect to each of the combinations.

Description of Operation of the First Exemplary Embodiment

Next, detailed description will be made of operation of the network operation system 200 according to the present exemplary embodiment with reference to the drawings.

Description of Operation of Operation Server

Figure 16:
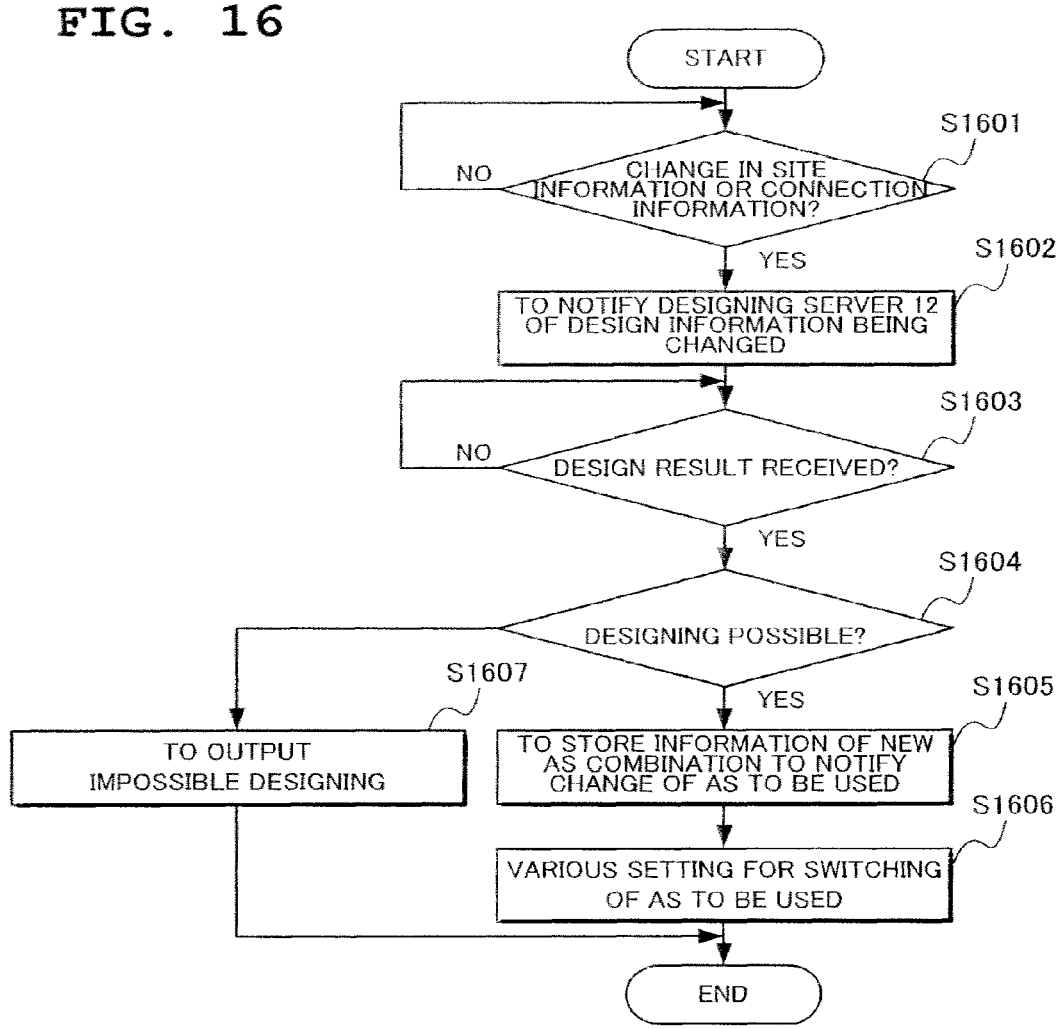
FIG. 16 is a diagram showing operation of the operation server according to the first exemplary embodiment of the present invention.

First, with reference to FIG. 15 and FIG. 16, detailed description will be made of operation of the operation server 7. FIG. 16 is a flow chart showing operation of the operation server according to the present exemplary embodiment.

When from the site information management unit 81, a notification is made related to new establishment of at least one site of a set of sites within a range related to service, or withdrawal of an existing site, or setting of an AS which newly becomes usable in an existing site or withdrawal of a currently usable AS, or when a notification that an AS connection relationship changes is given from the connection relationship monitoring unit 83 ("YES" at Step S1601), the operation processing unit 82 notifies the designing server 12 of design information including a set of sites, an AS usable in each site, existence/non-existence of a connection relationship between ASs and a cost of an AS link after a change through the input/output device from/to a designing server (Step S1602).

Next, upon receiving the design result from the designing server 12 ("YES" at Step S1603), the operation processing unit 82 checks whether the design result indicates whether designing is possible (Step S1604). When the design result indicates that designing is possible, a combination of ASs each to be used in each site is received and when the design result indicates that designing is impossible, a notification to that effect is received.

When the design result indicates that designing is impossible ("NO" at Step S1604), the operation processing unit 82 displays the effect that designing is impossible on the output device 4 (Step S1607) to end the operation.

When the design result indicates that designing is possible ("YES" at Step S1604), the operation processing unit 82 stores a combination of new ASs included in the design result in the operation information storage unit 92, as well as notifying the connection monitoring unit 83 of a change of an AS to be used (Step S1605).

Next, with respect to each site, the operation processing unit 82 executes various kinds of setting for the switching to an AS to be newly used in each site via the input/output device 11 from/to a site (Step S1606).

As a specific method of switching to a new AS to be used by each site, the operation processing unit 82 changes setting of a default router in each application server 1030 for use in transferring data to the outside of the sites 1000 to the edge router 1010 which terminates the AS to be newly used in the site 1000.

Description of Operation of Designing Server

Figure 2:
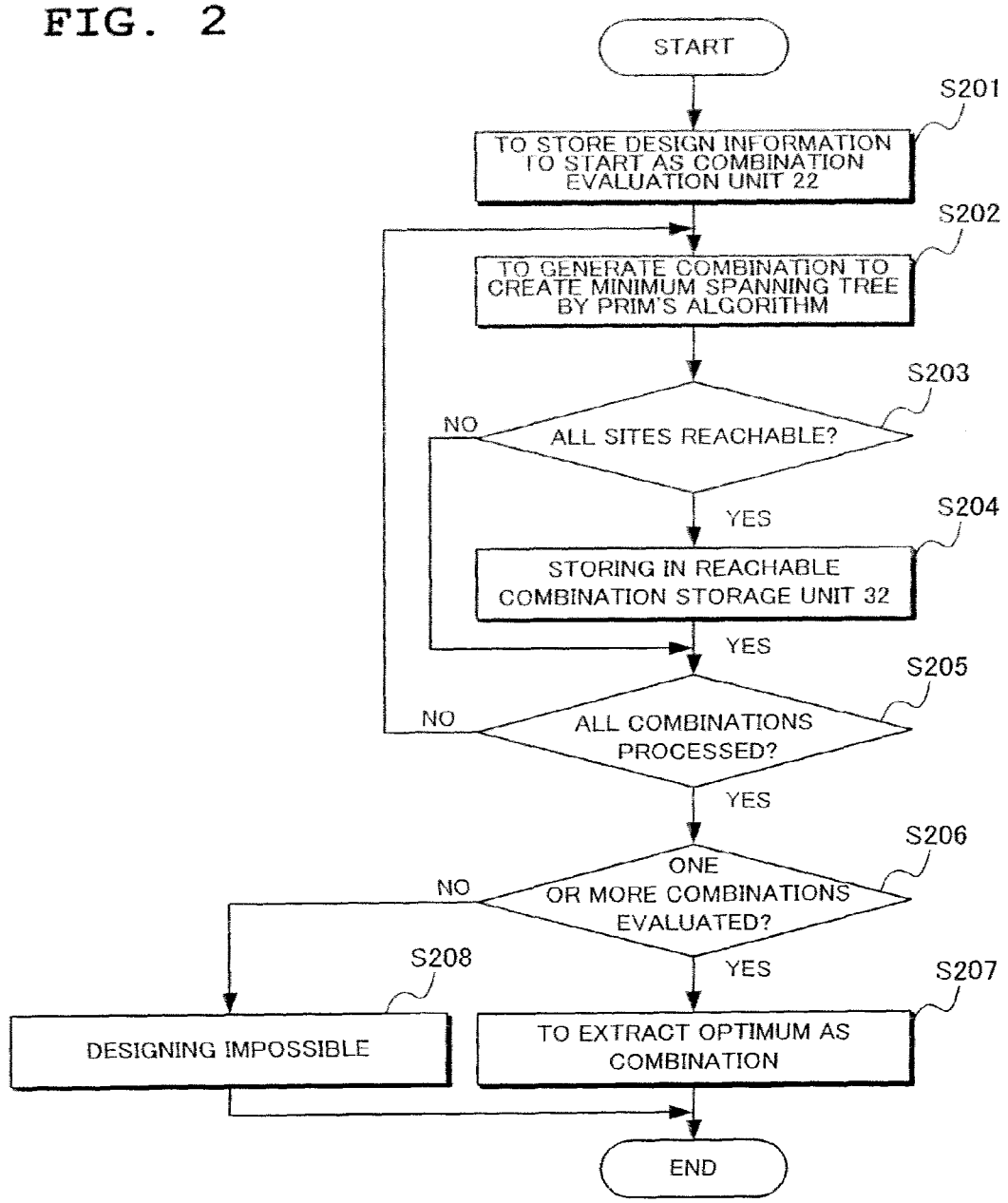
FIG. 2 is a flow chart showing operation of the designing server according to the first exemplary embodiment of the present invention.

Next, with reference to FIG. 1 and FIG. 2, operation of the designing server 12 will be detailed.

First, the design information processing unit 21 inputs design information applied from the operation server through the input/output device 13 from/to an operation server and the design information processing unit 21 converts the design information in question into a storage format and stores the obtained information in the design information storage unit 31 to start the AS combination evaluation unit 22 (Step S201).

Next, the AS combination evaluation unit 22 refers to the design information stored in the design information storage unit 31 to generate a combination of AS candidates each to be used by each site, as well as creating a minimum spanning tree corresponding to the AS candidate combination based on a cost applied between ASs connected with each other by the Prim's algorithm (Step S202). Minimum spanning tree will be described in the description of evaluation of an objective function.

Next, in order to check whether all the sites are reachable or not, the AS combination evaluation unit 22 refers to the design information stored in the design information storage unit 31 to check whether the minimum spanning tree obtained at Step S202 includes all the sites included in the design information (Step S203). When the minimum spanning tree includes all the sites included in the design information, the AS combination evaluation unit 22 determines a combination of AS candidates forming the minimum spanning tree as a combination of AS candidates in which links between all sites are reachable ("YES" at Step S203) and stores the AS candidate combination in question and information of AS links forming the minimum spanning tree in question in the reachable combination storage unit 32 (Step S204) to proceed to Step S205.

When the minimum spanning tree fails to include all the sites, the AS combination evaluation unit 22 determines that the combination of AS candidates forming the minimum spanning tree is not a combination of AS candidates in which links between all the sites are reachable ("NO" at Step S203) to proceed to Step S205.

Next, the AS combination evaluation unit 22 checks whether all the patterns of combinations of AS candidates each used by each site are processed (Step S205).

When all the patterns of combinations of AS candidates each used by each site are processed ("YES" at Step S205), the AS combination evaluation unit 22 proceeds to Step S206.

When not all the patterns of combinations of AS candidates each used by each site are processed ("NO" at Step S205), the AS combination evaluation unit 22 returns to Step S202 to repeat Steps S202 to Step S205 until all the patterns of combinations of AS candidates each used by each site are processed.

After processing all the patterns of combinations of AS candidates each one used by each site ("YES" at Step S205), the optimization processing unit 23 refers to the reachable combination storage unit 32 to check whether there exists at least one combination of AS candidates in which links between all the sites are reachable (Step S206).

When there exists at least one combination of AS candidates in which links between all the sites are reachable ("YES" at Step S206), the optimization processing unit 23 calculates a combination of ASs which optimizes an objective function. The optimization processing unit 23 transfers the AS combination in question calculated as a combination of ASs to be newly used to the operation server 7 through the input/output device 13 from/to an operation server (Step S207) to end the operation.

When there exists no combination of reachable ASs ("NO" at Step S206), the optimization processing unit 23 transfers the effect that designing is impossible to the operation server 7 through the input/output device 13 from/to an operation server (Step S208) to end the operation.

Description of Optimum as Combination calculation Operation

Figure 3:
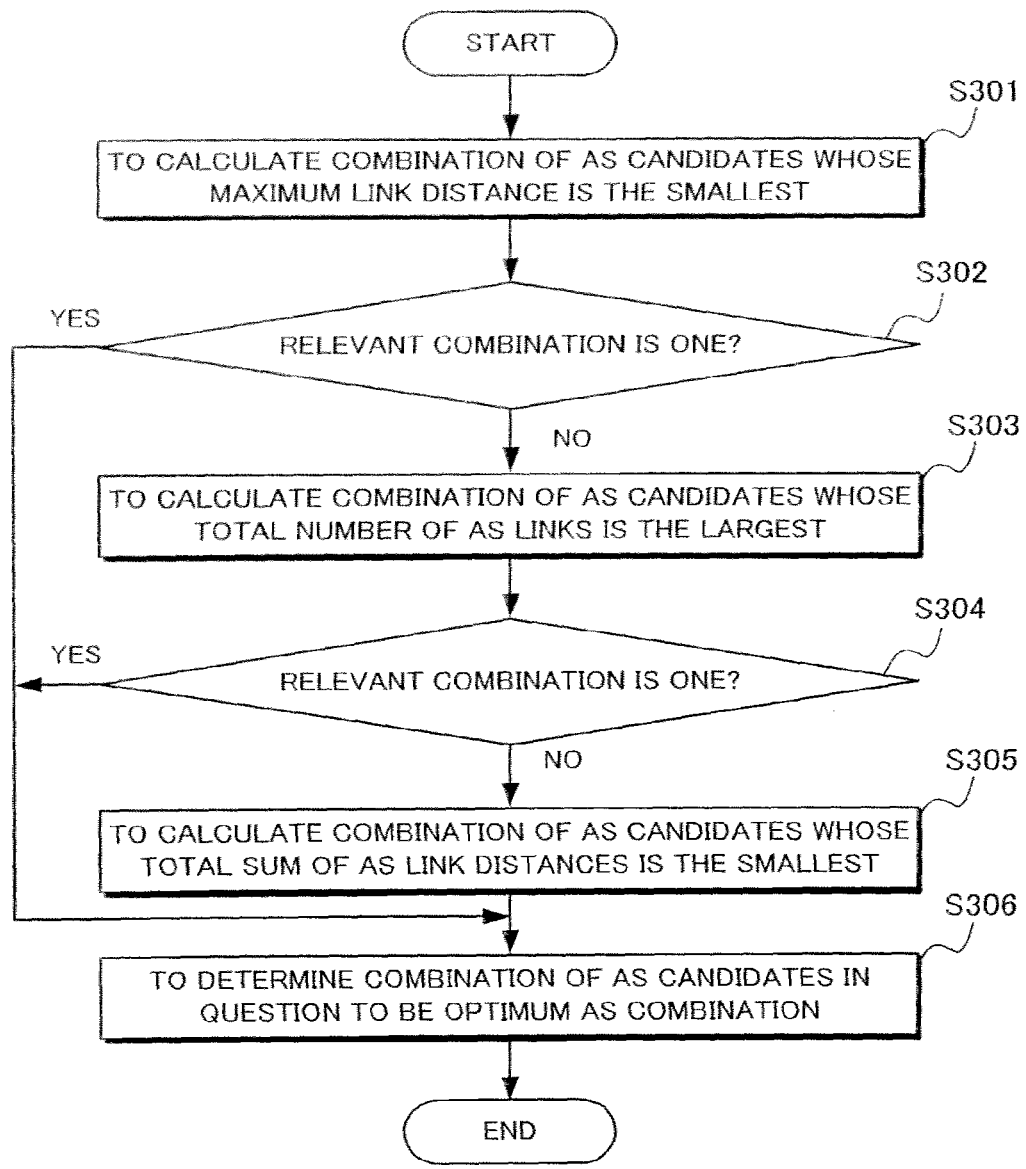
FIG. 3 is a flow chart showing operation of calculating an op AS combination according to the first the exemplary embodiment of the present invention.

In the following, detailed description will be made of a specific method of calculating an optimum AS combination at Step S207 of FIG. 2 with reference to FIG. 3. FIG. 3 is a flow chart showing operation of calculating an optimum AS combination according to the present exemplary embodiment. Object of design to be considered in the present exemplary embodiment is to maximize a worst value of end-to-end data transfer throughput.

First, the optimization processing unit 23 evaluates a maximum value of cost of AS links forming a minimum spanning tree corresponding to each AS candidate combination stored at Step S204 as an objective function to obtain an AS candidate combination in which the maximum value of cost of an AS link will be the smallest (Step S301) among all the AS candidate combinations.

Maximum value of link cost represents a distance of a link between ASs which goes to the largest (largest link distance).

This intends to maximize a minimum value of an end-to-end throughput S between transmission and reception sites under a condition where for transferring HTTP data between certain transmission and reception sites, for example, each relay site operates as an HTTP proxy and sites at the opposite ends of an AS link terminate TCP.

Description will be here made of a background where a largest link distance gives a minimum value of the throughput S.

First, as the throughput S, a minimum value of a throughput on each AS link included in an end-to-end path is given.

Throughput on each AS link, since TCP is terminated between sites at the opposite ends of the link, is inversely proportional to RTT affected by a distance between sites which terminate the AS link at the opposite ends (cost applied to the AS link).

Accordingly, since the longer the distance between sites becomes, the smaller becomes the minimum value of the throughput S, the minimum value of the throughput S between the respective transmission and reception sites is determined by the largest link cost (the largest link distance) included in its AS graph.

In order to minimize the maximum link cost while maintaining connectivity of an applied AS graph, an AS link having the largest cost within a range where connectivity is maintained will be sequentially removed from the applied AS graph. Ultimately obtained by this procedure is considered to be equivalent to a minimum spanning tree although none of its evidence is shown.

Listed as reference literature for the above description is Non-Patent Literature 4.

Since if a minimum spanning tree is extracted, connectivity can be determined, a minimum spanning tree is extracted at Step S202 earlier than evaluation of an objective function at Step S207.

As a result of Step S301, when there is one combination of AS candidates which minimizes the largest link distance ("YES" at Step S302), the optimization processing unit 23 determines the combination of AS candidates in question to be an optimum AS combination to be used in each site (Step S306).

As a result of Step S301, when there are a plurality of combinations of AS candidates which minimize the largest link distance ("NO" at Step S302), the optimization processing unit 23, with respect to the plurality of AS candidate combinations which minimize the largest link distance, considers the total number of AS links forming the minimum search tree corresponding to each AS candidate combination as an objective function to obtain an AS candidate combination whose total number of AS links in question is the largest (Step S303).

Here, obtaining a combination of AS candidates whose total number of AS links is the largest at Step S303 intends to take more transfer paths between certain sites and to select a more appropriate path at the time of a failure or congestion.

As a result of Step S303, when there is one combination of AS candidates which maximizes the total number of AS links ("YES" at Step S304), the optimization processing unit 23 determines the combination of AS candidates in question to be an optimum AS combination to be used in each site (Step S306).

As a result of Step S303, when there are a plurality of combinations of AS candidates which maximize the total number of AS links ("NO" at Step S304), the optimization processing unit 23, with respect to the plurality of AS candidate combinations which maximize the total number of AS links, considers the total sum of distances of AS links forming a minimum search tree corresponding to each AS candidate combination as an objective function to obtain an AS candidate combination whose total sum of distances of the AS links in question is the smallest (Step S305). The optimization processing unit 23 determines the obtained combination of AS candidates to be an optimum AS combination to be used in each site (Step S306).

Thus, when there are a plurality of optimum solutions of a first objective function, the optimization processing unit 23 evaluates a second objective function with respect to a plurality of AS candidate combinations which will be an optimum solution of the first objective function, and when there are a plurality of optimum solutions of the second objective function, evaluates a third objective function with respect to a plurality of AS candidate combinations which will be an optimum solution of the second objective function and considers an AS candidate combination which will be an optimum solution of the third objective function as an optimum AS combination.

Accordingly, in the present exemplary embodiment, information related to a method of calculating first, second and third objective functions is stored in the design information storage unit 31.

First Example

Next, operation of the present exemplary embodiment will be described with respect to a specific example.

Description of Structure

Figure 4:
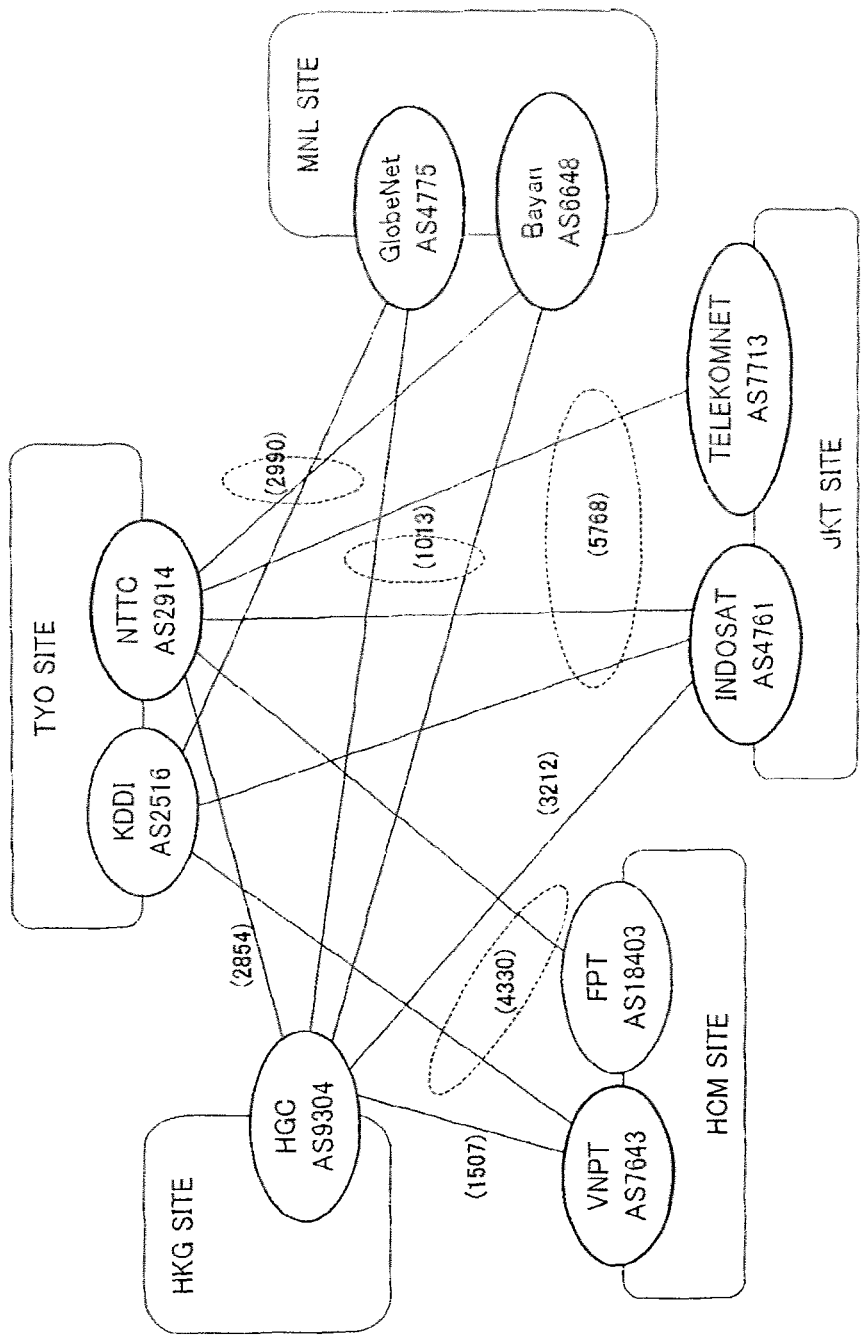
FIG. 4 is a diagram showing a design problem as a specific example for which the designing server according to the first exemplary embodiment of the present invention operates.

FIG. 4 shows an example of a design problem indicating five sites of TYO, HKG, HCM, JKT and MNL, AS candidates applied to the respective sites, a connection relationship between AS candidates and a distance between the sites.

FIG. 5 shows a result obtained by applying the above-described operation of the present exemplary embodiment to the example of the design problem shown in FIG. 4. The result is stored in the reachable combination storage unit 32.

(TYO, HCM, JKT, MNL) shown here in FIG. 5 indicates a combination of ASs selected by the respective sites. Since the HKG site has only one AS candidate, it is omitted from combination elements.

For the simplification of expression of a combination, AS to be selected in each site is replaced by 0 or 1 in FIG. 5 as shown in the following:

TYO site: AS2516=0, AS2914=1;
HCM site: AS7643=0, AS18403=1;
JKT site: AS4761=0, AS7713=1; and
MNL site: AS4775=0, AS6648=1, Description of Operation Next, description will be made of contents of the table shown in FIG. 5 and a process of optimization.

In a minimum spanning tree corresponding to a combination of AS candidates whose reachability between all the sites is checked by the AS combination evaluation unit 22, first, the optimization processing unit 23 evaluates a maximum value of cost of an AS link (distance between cities) as a first objective function.

With reference to FIG. 5, a combination which minimizes the cost maximum value of an AS link (Max link length) includes two, (1, 0, 0, 0) and (1, 0, 0, 1).

Accordingly, the optimization processing unit 23 then evaluates a total number of AS links as a second objective function.

While the number of AS links (# of links) of (1, 0, 0, 0) is five, the number of AS links of (1, 0, 0, 1) is six, so that (1, 0, 0, 1) will be a solution of the problem.

The optimization processing unit 23 therefore determines that the AS combination (1, 0, 0, 1), that is, (AS2914, AS9304, AS7643, AS4761, AS6648) is an AS combination to be used by each site.

Effects of the First Exemplary Embodiment

Effects of the present exemplary embodiment will be described in the following.

According to the present exemplary embodiment, by explicitly optimizing a given objective function, an optimum AS combination can be determined which enables data transfer with high throughput.

This enables designing of a network which allows data transfer with high throughput to be executed between servers.

The reason is that since on a data transfer path between sites, among ASs each held by each site, no other ASs than that to be used are included in the data transfer path, the number of hops of the data transfer path is reduced and RTT at the time of transfer between sites is reduced, thereby reducing a chance of a packet loss.

Figure 13:
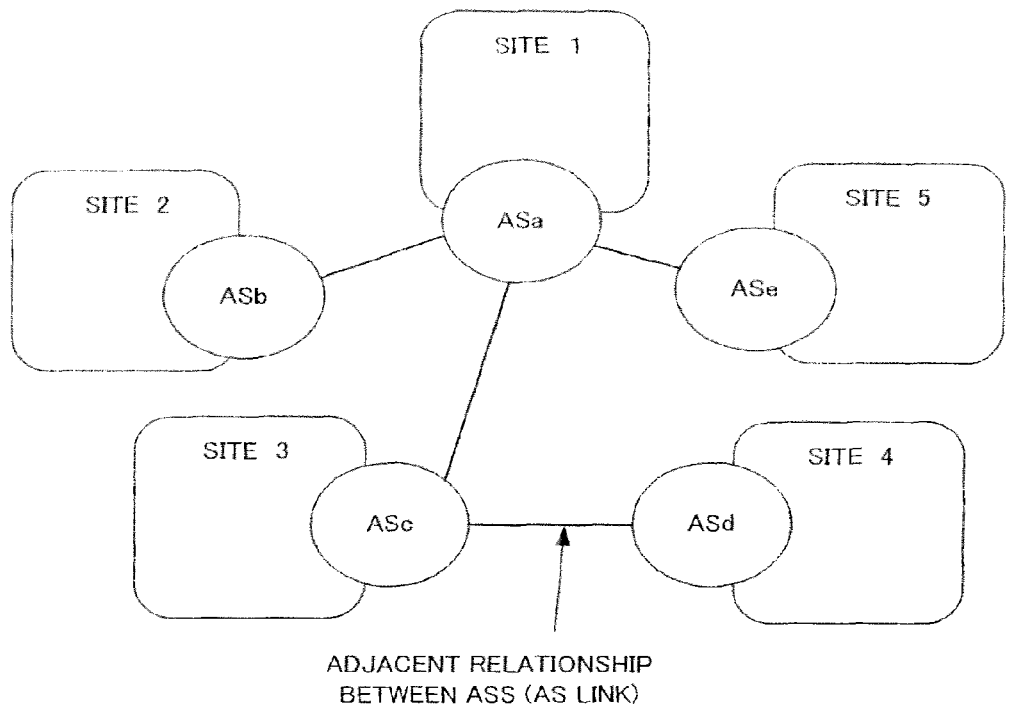
FIG. 13 is a diagram for use in explaining the principle of the present invention.

In FIG. 13, for example, with an AS combination (ASa. ASb. ASc, ASd, ASe) applied to sites 1 to 5, from the site 2 to the site 4, for example, a path ASb→ASa→ASc→ASd is established, which has more improved throughput than that in a case where a large number of other ASs than those of the combination are included between the ASb and ASd.

In addition, the present exemplary embodiment enables improvement of throughput even in a case of addition of a new site to a set of sites which provide certain service or withdrawal from the set, or according to a change of a connection relationship between ASs.

The reason is that when a connection relationship changes in a set of sites or between ASs, a combination of ASs each to be used in each site is re-designed to change setting of each site with the re-designed combination of ASs as a combination of ASs to be newly used.

The present exemplary embodiment also enables performance such as throughput to be improved cost-effectively.

The reason is that for setting up a network which links all the sites, none of a high-cost dedicated line, IP-VPN and a virtual private network such as a wide area Ethernet is used.

Second Exemplary Embodiment

Next, a network operation system 200 according a second exemplary embodiment of the present invention will be detailed with reference to the drawings. Since an entire structure of the network operation system 200 according to the present exemplary embodiment is the same as that of the above-described first exemplary embodiment, no detailed description will be made thereof.

While in the first exemplary embodiment, the designing server 21 executes so-called complete search for optimizing an objective function under a given constraint condition, in the present exemplary embodiment, the designing server 21 obtains a combination of ASs each to be used by each site by a heuristic method called constrained Prim's algorithm.

Prim's algorithm here is one of methods for obtaining a minimum spanning tree. As an algorithm, a node to be newly added to a subtree already obtained is selected such that cost of a link from a node in a current subtree to a link leading to the same will be minimum. This processing will be recursively executed until no further node to be added remains.

In the present exemplary embodiment, prioritization is executed with respect to sites included in design information whose details will be described later.

Site priority is based on the order of degrees of sites (site degree). More specifically, all the sites included in design information are given priority in the descending order of site degrees.

Site degree here is assumed to be a degree of a largest AS (AS degree) in each site. AS degree represents the total number of other ASs with which each AS has a connection, that is, with respect to a certain AS, the total number of AS links extending from the AS.

When there are sites whose site degrees are equal in prioritization, with respect to sites whose site degrees are equal, AS numbers of ASs which give a degree of a site in each site (i.e. AS whose AS degree is the largest in each site) are respectively compared to prioritize the sites in the ascending order of the AS numbers in question.

In each site, AS prioritization is executed first in the descending order of AS degrees of then ASs and when a plurality of ASs whose AS degrees are equal exist, prioritization is executed with respect to the plurality of ASs in the ascending order of AS numbers.

In the present exemplary embodiment, based on information of priority (priority information) obtained by the above-described method, a subtree is created by a constrained Prim's algorithm to which the following constraints are given.

First constraint is to give highest site priority to a site at which generation of a subtree is started. When there are a plurality of AS links whose link costs to be added next are equal according to the Prim's algorithm, select a site whose priority is the highest among sites at which the AS links in question reach as a site to be added.

Second constraint is to select, when a plurality of reachable AS candidates exist in a site determined as a site to be added next according to the Prim's algorithm, an AS whose priority is the highest among the plurality of AS candidates in question.

Third constraint is to delete, after selecting one AS in a certain site, other AS candidates in the site and an AS link leading to other AS candidates in question. Then, when entering and going out from the site, the selected AS should be passed through without fail.

Figure 8:
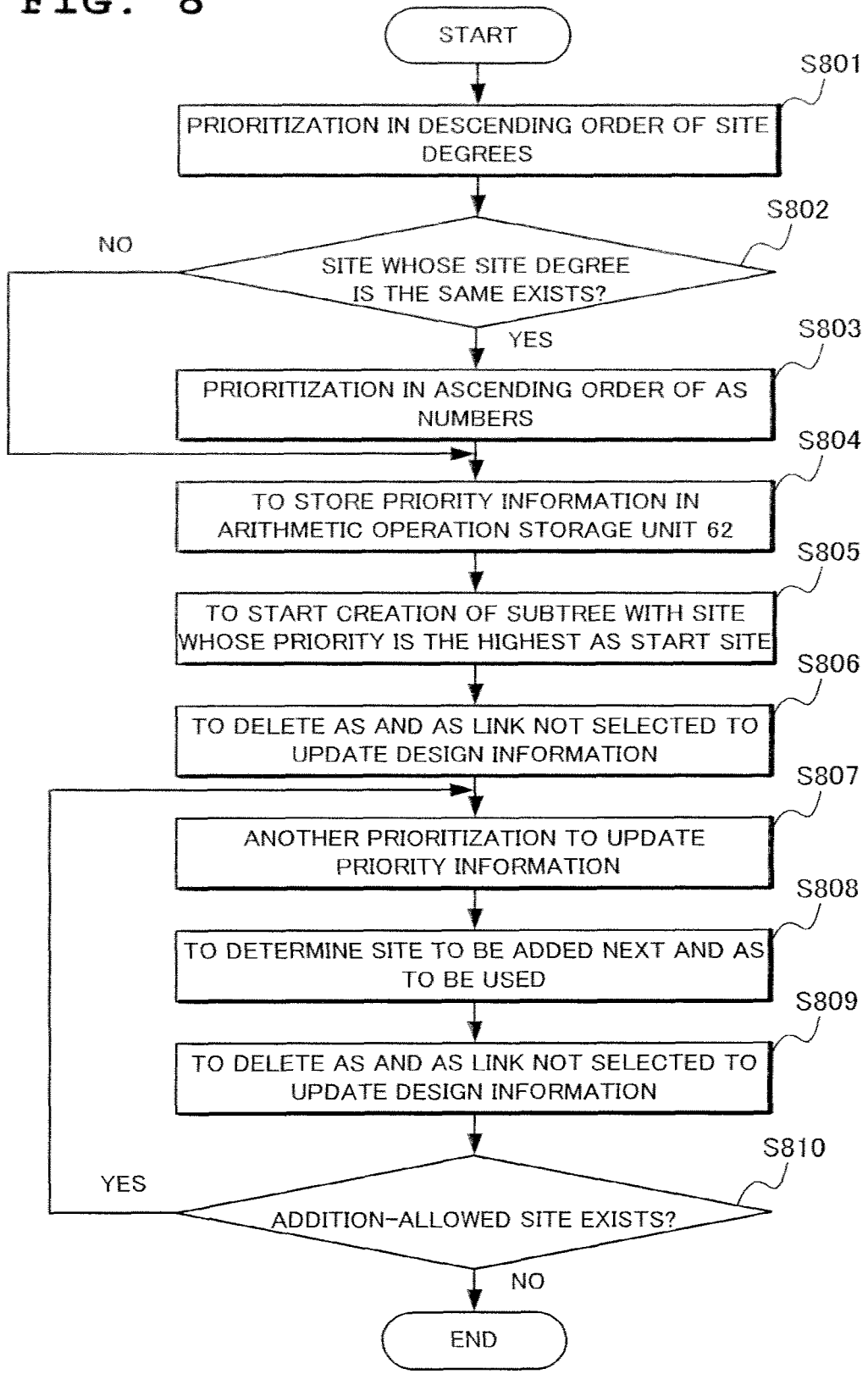
FIG. 8 is a flow chart showing operation of generating a subtree by the designing server according to the second exemplary embodiment of the present invention.

By the above-described third constraint, deletion of an AS not selected and an AS link leading to the AS in question might decrease the degree of an AS in each site. Therefore, assume that at every deletion of an AS not selected and a link extending from the AS in question by the third constraint, prioritization processing shown in FIG. 8 is executed with respect to a site yet to be added to the subtree to recalculate priority.

Figure 6:
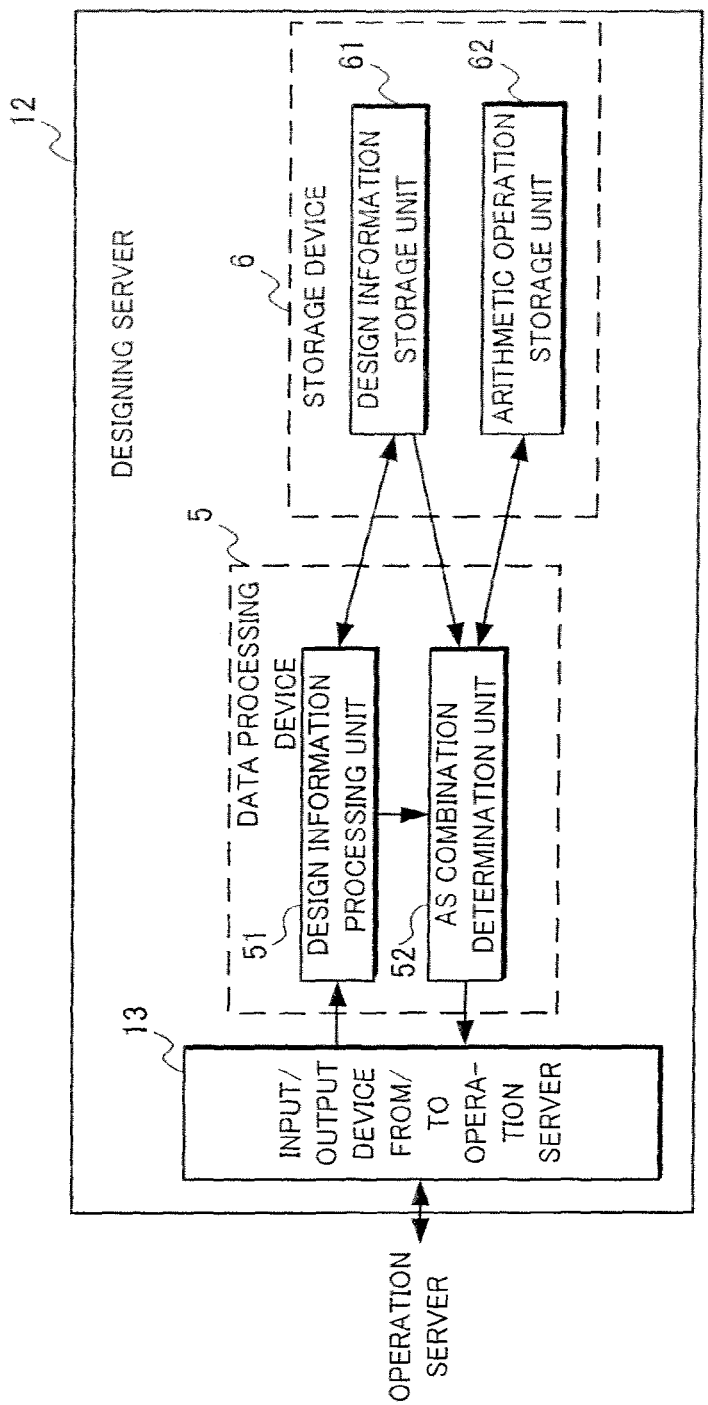
FIG. 6 is a block diagram showing s structure of a designing server according to a second exemplary embodiment of the present invention.

With reference to FIG. 6, the designing server 12 according to the second exemplary embodiment of the present invention includes the input/output device 13 from/to an operation server, a data processing device 5 and a storage device 6.

Since the input/output device 13 from/to an operation server is the same as the input device 1 and the output device 4 of the first exemplary embodiment shown in FIG. 1, no detailed description will be made thereof.

The data processing device 5 comprises a design information processing unit 51 and an AS combination determination unit 52.

The design information processing unit 51 creates an input format to be displayed on the output device 4 for a designer to input design information.

The design information processing unit 51 executes processing of converting design information input by a designer through the input device 1 according to the input format into a form which is easy for the AS combination determination unit 52 to process and storing the obtained information in a design information storage unit 61.

Design information here includes a site, an AS candidate applied to each site, existence/non-existence of a connection relationship between each paired ASs between different sites and when a connection relationship exists, cost applied to the connection relationship in question.

After storing the design information converted into a form which is easy for the AS combination determination unit 52 to process in the design information storage unit 31, the design information processing unit 51 activates the AS combination determination unit 52.

The AS combination determination unit 52 extracts the design information stored in the design information storage unit 61 and stores the same in an arithmetic operation storage unit 62.

The AS combination determination unit 52 also determines a combination of ASs each one to be used by each site from given AS candidates by the constrained Prim's algorithm and simultaneously determines its reachability. The constrained Prim's algorithm will be detailed in the description of operation.

The storage device 6 comprises the design information storage unit 61 and the arithmetic operation storage unit 62.

Stored in the design information storage unit 61 is design information including a site, an AS candidate applied to each site, existence/non-existence of a connection relationship between the respective AS candidates and when a connection relationship exists, cost applied to the connection relationship in question.

In the arithmetic operation storage unit 62, design information is accumulated which includes such data to be updated by arithmetic operation processing based on the constrained Prim's algorithm by the AS combination determination unit 52 as a yet-to-be visited site and a link between ASs.

Description of Operation of the Second Exemplary Embodiment

Figure 7:
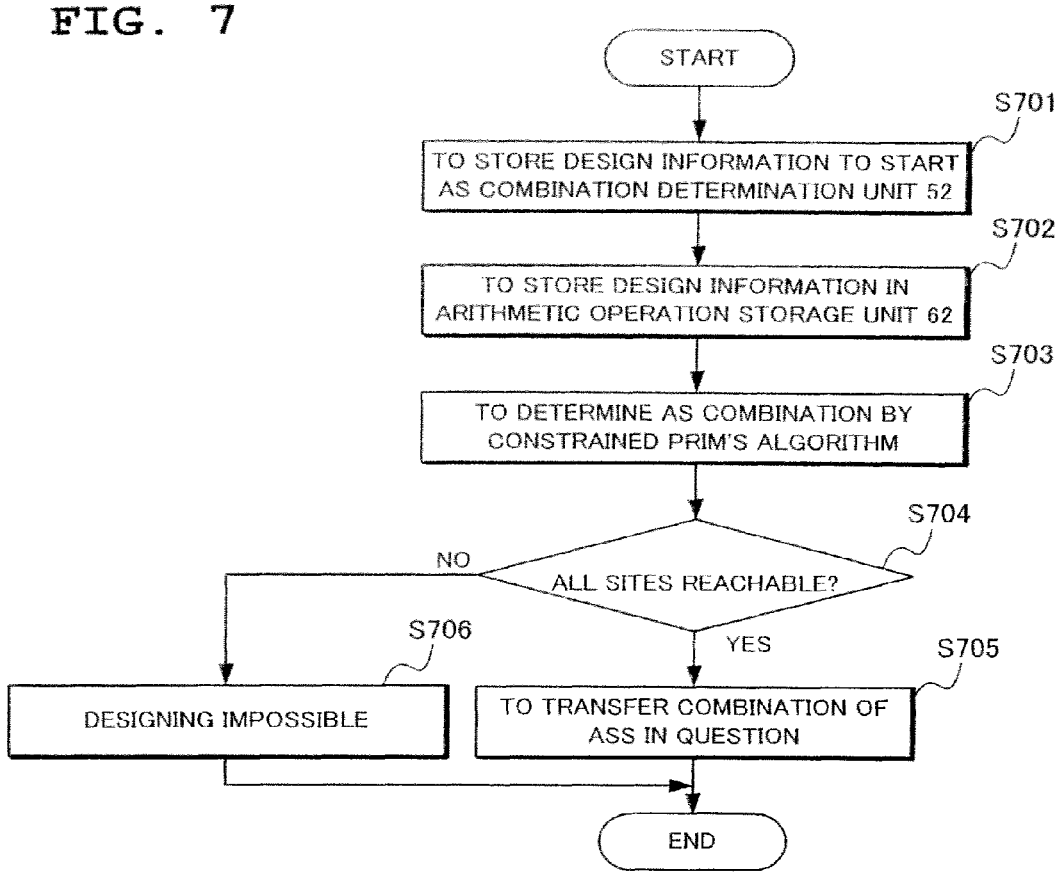
FIG. 7 is a flow chart showing operation of the designing server according to the second exemplary embodiment of the present invention.

Next, detailed description will be made of operation of the present exemplary embodiment with reference to FIG. 6 and FIG. 7. FIG. 7 is a flow chart showing operation of the designing server 12 according to the present exemplary embodiment.

First, the design information processing unit 51 inputs design information applied from the operation server through the input/output device 13 from/to an operation server and the design information processing unit 51 converts the design information into a storage format and stores the obtained information in the design information storage unit 61 to start the AS combination determination unit 52 (Step S701).

Next, the AS combination determination unit 52 takes out the design information stored in the design information storage unit 61 and stores the same in the arithmetic operation storage unit 62 (Step S702) to determine a combination of ASs each one to be used by each site by the constrained Prim's algorithm (Step S703). Specific operation of Step S703 will be described later.

After determining the combination of AS candidates each one to be used by each site (Step S703), the AS combination determination unit 52 refers to subtree information of the arithmetic operation storage unit 62 and the design information of the design information storage unit 61 in order to determine whether all the sites are reachable or not and checks whether the currently obtained subtree includes all the sites applied first as design information (Step S811). Subtree information will be described later.

In a case where the currently obtained subtree includes all the sites first applied as design information, the AS combination determination unit 52 determines that an AS combination selected when each site is applied to the subtree in question is an AS combination whose links between sites are all reachable ("YES" at Step S704). The AS combination determination unit 52 transfers the AS combination in question as a combination of ASs to be newly used to the operation server 7 through the input/output device 13 from/to an operation server (Step S705) to end the operation.

In a case where the currently obtained subtree fails to include all the sites first applied as design information, the AS combination determination unit 52 determines that not all links between the sites are reachable by the AS combination selected when each site is applied to the subtree in question ("NO" at Step S704) to transfer that effect to the operation server 7 through the input/output device 13 from/to an operation server (Step S706) to end the operation.

Description of Operation of Subtree Generation

Here, operation of Step S703 will be described with reference to FIG. 8. FIG. 8 is a flow chart showing operation of subtree generation according to the present exemplary embodiment.

With reference to FIG. 8, first, the AS combination determination unit 52 prioritizes all the sites included in the design information in the descending order of site degrees (Step S801).

As a result of Step S801, when there exist sites whose site degrees are equal ("YES" at Step S802), the AS combination determination unit 52 compares, with respect to sites whose site degrees are equal, AS numbers of ASs each of which gives a degree of a site in each site, that is, ASs each having the largest AS degree in each site to prioritize the sites in the ascending order of the AS numbers in question (Step S803).

Next, the AS combination determination unit 52 stores information of site priority in the arithmetic operation storage unit 62 (Step S804).

Next, the AS combination determination unit 52 refers to the arithmetic operation storage unit 62, selects a site whose priority is the highest as a start site and further selects an AS whose priority is the highest in the site in question to start generation of a subtree (Step S805).

Next, the AS combination determination unit 52 deletes an AS not selected and an AS link extending from the AS in question to update the design information stored in the arithmetic operation storage unit 62 based on information of the deleted AS and AS link (Step S806).

Next, the AS combination determination unit 52 refers to the design information of the arithmetic operation storage unit 62, executes the same processing as that of Steps S801 to S804 with respect to all the sites yet to be added to the subtree and again prioritizes the sites to update the priority information stored in the arithmetic operation storage unit 62 (Step S807).

Next, the AS combination determination unit 52 refers to the design information of the arithmetic operation storage unit 62, determines a site to be added to the subtree next by the constrained Prim's algorithm, refers to the priority information of the arithmetic operation storage unit 62, determines an AS whose order is the highest in the site determined as a site to be added to the subtree next as an AS to be used in the site in question and adds the determined site to the subtree (Step S808).

More specifically, a site to be added next is a site yet to be added to the subtree, for which selected is a site whose link cost is the smallest among sites having AS candidates leading to an AS link which extends from an AS of a site added to the subtree immediately before (immediately before added site).

Next, the AS combination determination unit 52 deletes an AS not selected in the site determined as a site to be added next to the subtree and an AS link leading to the AS in question to update the design information stored in the arithmetic operation storage unit 62 based on the information of the deleted AS and AS link (Step S809).

Next, the AS combination determination unit 52 refers to the arithmetic operation storage unit 62 to check whether there exists a site which can be added next (addition-allowed site) (Step S810).

More specifically, the AS combination determination unit 52 searches for a site having an AS candidate leading to an AS link extending from an AS of the immediately before added site and when no site is found which leads to the AS of the immediately before added site, returns to a site immediately precedent to the immediately before added site to similarly search for a site having an AS candidate leading to an AS link extending from an AS of the immediately preceding site in question. Then, determine the site found by the above search as an addition-allowed site.

When determining that an addition-allowed site exists ("YES" at Step S810), the AS combination determination unit 52 returns to the processing of Step S807 to repeat the processing of Steps S807 to S810 until no further addition-allowed site remains and when determining at Step S810 that no addition-allowed site exists, the AS combination determination unit ends the operation of creating a subtree ("NO" at Step S810).

Second Example

Next, operation of the present exemplary embodiment will be described with reference to a specific example.

Description of Structure

Figure 9:
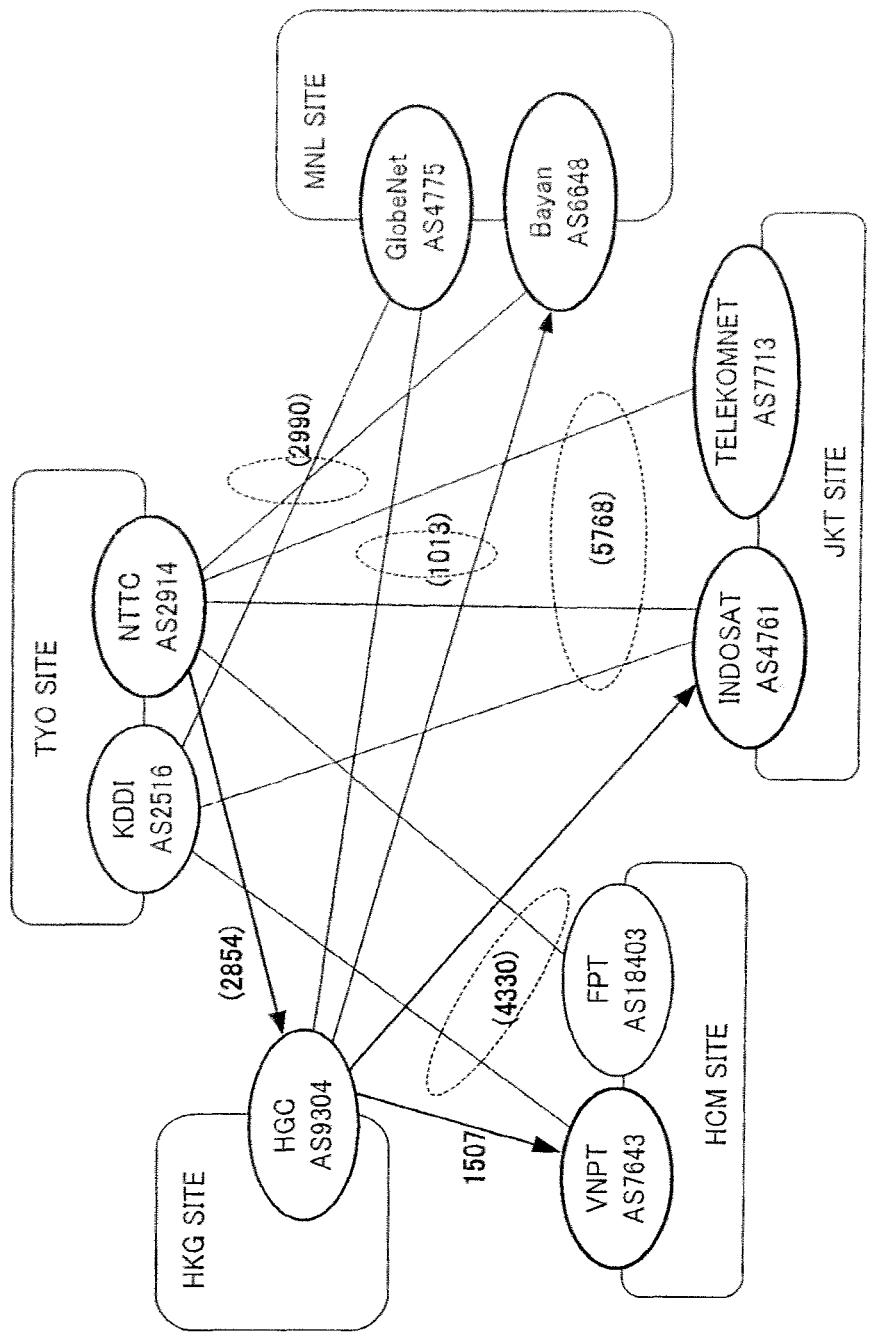
FIG. 9 is a diagram showing a specific example of operation of the designing server according to the second exemplary embodiment of the present invention.

FIG. 9 shows a result obtained when the above-described operation of the present exemplary embodiment is applied to the example of the design problem given in FIG. 4. The result is stored in the arithmetic operation storage unit 62.

Description of Operation

In the following, description will be made of a procedure of obtaining a solution shown in FIG. 9 by the constrained Prim's algorithm according to the present exemplary embodiment.

First, giving priority to all the sites at Steps S801 to S804 of FIG. 8 will have a result as follows. Indication in a parenthesis represents an AS which gives a site degree.

TYO(AS2914)>HKG(AS9304)>JKT(AS4761)>MNL(AS4775)>HCM(AS7643)

First, at Step S805, the TYO site is selected as a start site of the subtree.

The reason for the selection of AS2914 at the TYO site is that while the AS degree of AS2516 is "3", the AS degree of AS2914 is "4".

Then, AS2516 not selected at Step S806 and an AS link extending from AS2516 are deleted.

Next, after again prioritizing other sites than the TYO site at Step S807, determine a site to be added next to the subtree at Step S808.

Since an AS link extending from the TYO(AS2914) whose link cost is the smallest is TYO-HKG, add the HKG site to the subtree at Step S808 to update the design information at Step S809. Since the HKG site has only one AS existing, AS9304 will be necessarily an AS to be used.

Next, upon confirming the addition-allowed site at Step S810, since AS links extending from HKG (AS9304) are three sites, MNL, JKT and HCM, return to Step S807.

Then, after again prioritizing other sites than the TYO site and the HKG site at Step S807, determine a site to be added next to the subtree at Step S808.

Again at Step S808, when considering the above-described three sites as a candidate to be added to the subtree of TYO-HKG since the cost between TYO and MNL is the smallest, add the MNL site to select AS6648 whose priority is higher.

Similarly, add the HCM site from HKG to select the reachable AS7643 thereafter. Lastly, add the JKT site from HKG to select the reachable AS4761.

Effects of the Second Exemplary Embodiment

Effects of the present exemplary embodiment will be described.

According to the present exemplary embodiment, selecting an AS whose degree is high enables a possibility of increasing the number of paths that can be taken between the AS and other ASs to be increased.

According to the present exemplary embodiment, even when the number of sites or the number of AS candidates is increased, a combination of ASs to be used by the respective sites can be determined with a less amount of calculation than that of the first exemplary embodiment.

The reason is as follows.

With the number of sites as N, a maximum value of the number of ASs usable by each site as A and a maximum value of the total number of AS links in an AS combination as L, a calculation amount (computational complexity) by an ordinary Prim's algorithm will be $L*\log N$. On the other hand, since in a constrained Prim's algorithm, every time a site is added, an AS usable by the site is sorted among the remaining sites, the calculation amount of the processing in question will be $O(N*A*\log A)$, so that the calculation amount by the constrained Prim's algorithm will be $O(L*N*\log N*A*\log A)$.

On the other hand, in the first exemplary embodiment, with the total number of AS combinations as AN, when extracting a minimum spanning tree by the Prim's algorithm, the amount of calculation for the extraction will be $O(L*\log N)$, so that the amount of calculation for the extraction of the minimum spanning tree by the Prim's algorithm will be $O(AN*L*\log N)$.

In the above-described first and second exemplary embodiments, as to a connection relationship between AS candidates applied to the respective sites, information about the connection relationship can be obtained by the following manner.

From, for example, a site of CIDR REPORT (http://www.cidr-report.org/as2.0/), information is obtained about a current connection relationship which is obtained from a router handling BGP.

From a site of AS relationship of CAIDA (http://www.caida.org/data/active/as-relationships/), obtained is up to a result of peering and estimation of transit.

Further, from a site of Robtex (http://www.robtex.com/), obtained is information about a connection relationship based on information registered in Internet Routing Registry.

Third Exemplary Embodiment

Next, a network operation system 100 according to a third exemplary embodiment of the present invention will be detailed.

In the present exemplary embodiment, designing is executed including a site dedicated to relay other than the sites from which data is transmitted or at which data is received in the first and second exemplary embodiments.

More specifically, an AS combination is calculated with the respective sites included in the design information applied at Step S201 of FIG. 2 and Step S701 of FIG. 7 discriminated as a site from which transmission is made or at which reception is made or a site dedicated to relay.

Then, in checking reachability at Step S203 of FIG. 2 and Step S704 of FIG. 7, confirmation of reachability at least between sites given as a transmission site or a reception site is assumed to complete design. In other words, it is unnecessary to ensure reachability between all the relay sites applied and other sites.

Effects of the Third Exemplary Embodiment

Next, effects of the present exemplary embodiment will be described.

According to the present exemplary embodiment, applying a relay site other than transmission and reception sites improves data transfer throughput.

The reason is that assuming, for example, that in the problem example shown in FIG. 4, only the HKG site is a site dedicated to relay and the other sites are given as transmission or reception sites, in a case where the data transfer path includes the HKG site, the smallest value of the maximum link distance is 3212 as shown in FIG. 5.

On the other hand, in a case where the data transfer path fails to include the HKG site, 5768 between TYO and JKT will be the smallest value of the maximum link distance.

Accordingly, contrarily including the HKG site dedicated to relay enables reduction of the smallest value of the maximum link distance from 5768 to 3212 to improve data transfer throughput.

Fourth Exemplary Embodiment

Next, a network operation system 200 according to a fourth exemplary embodiment of the present invention will be detailed with reference to the drawings.

In a case of transferring data between a transmission site and a reception site by a path based on an AS graph obtained by the first and second exemplary embodiments, when the transmission site transfers a packet whose IP address is set at the reception site onto the Internet without change, if no connection relationship exists between ASs used by the transmission site and the reception site, respectively, the packet will be transferred according to BGP path control and will not be always transferred on a path intended by the designing method provided by the present invention.

In the present exemplary embodiment, therefore, when transferring HTTP data between a transmission site and a reception site, each relay site is operated as a proxy which terminates TCP and takes out HTTP data.

Moreover, when each of a plurality of sites requests the same data, each relay site is operated as a proxy cache so as to return the data at every request.

Then, it is set such that when a domain name corresponding to an origin site is applied, each edge site is allowed to transfer data based on a path between the transmission and reception sites that can be set on an AS graph obtained by the design.

When each site uses Squid as recited in the Non-Patent Literature 5, a next transfer destination of an HTTP get request is set as a "parent" of the proxy with respect to a domain included in URL required by the HTTP get request.

Then, when a plurality of paths exist between certain transmission and reception sites, a path whose maximum value of a distance of an AS link included in the path is the smallest is preferentially selected.

Distance of an AS link is here given by a distance between sites which terminate the AS link in question at the opposite ends. The reason is the same as that for the maximization of an end-to-end TCP throughput at the time of designing.

Description will be made of a method of determining a distribution path to the MNL site which is an edge site, with the TYO site as an origin site in a design example shown in FIG. 9, for example.

Although between the TYO site and the MNL site, there are a one-hop path of TYO-MNL (2990 km) and a two-hop path of TYO-HKG-MNL (2854 km+1013 km), because the two-hop path of TYO-HKG-MNL has a maximum link distance shorter than the other, the two-hop path of TYO-HKG-MNL will be preferentially used to the one-hop path of TYO-MNL.

When each site uses Squid as recited in the Non-Patent Literature 5, the HKG site and the TYO site are set to be a parent at the MNL site such that weights to be applied to the respective sites have a relationship HKG>TYO.

Effects of the Fourth Exemplary Embodiment

Next, effects of the present exemplary embodiment will be described.

According to the present exemplary embodiment, in a case of transferring data between a transmission site and a reception site by a path based on an AS graph obtained by the first and second exemplary embodiments, when the transmission site transfers a packet whose IP address is set at the reception site onto the Internet without change, even if no connection relationship exists between ASs used by the transmission site and the reception site, respectively, the packet will be transferred according to a path based on the AS graph in question.

While in the above-described first to fourth exemplary embodiments, each site takes an AS forming the Internet as an operation unit of a network to be selected/determined, a possible network operation unit based on other technique is an Ethernet domain discussed in MEF (Metro Ethernet Forum) shown in the Non-Patent Literature 6.

In the discussion, as a method of connection between Ethernet domains by different carriers or operators, standardization of E-NNI is also discussed.

Listed as reference literature related to the above description are the Non-Patent Literature 5 and the Non-Patent Literature 6.

Figure 10:
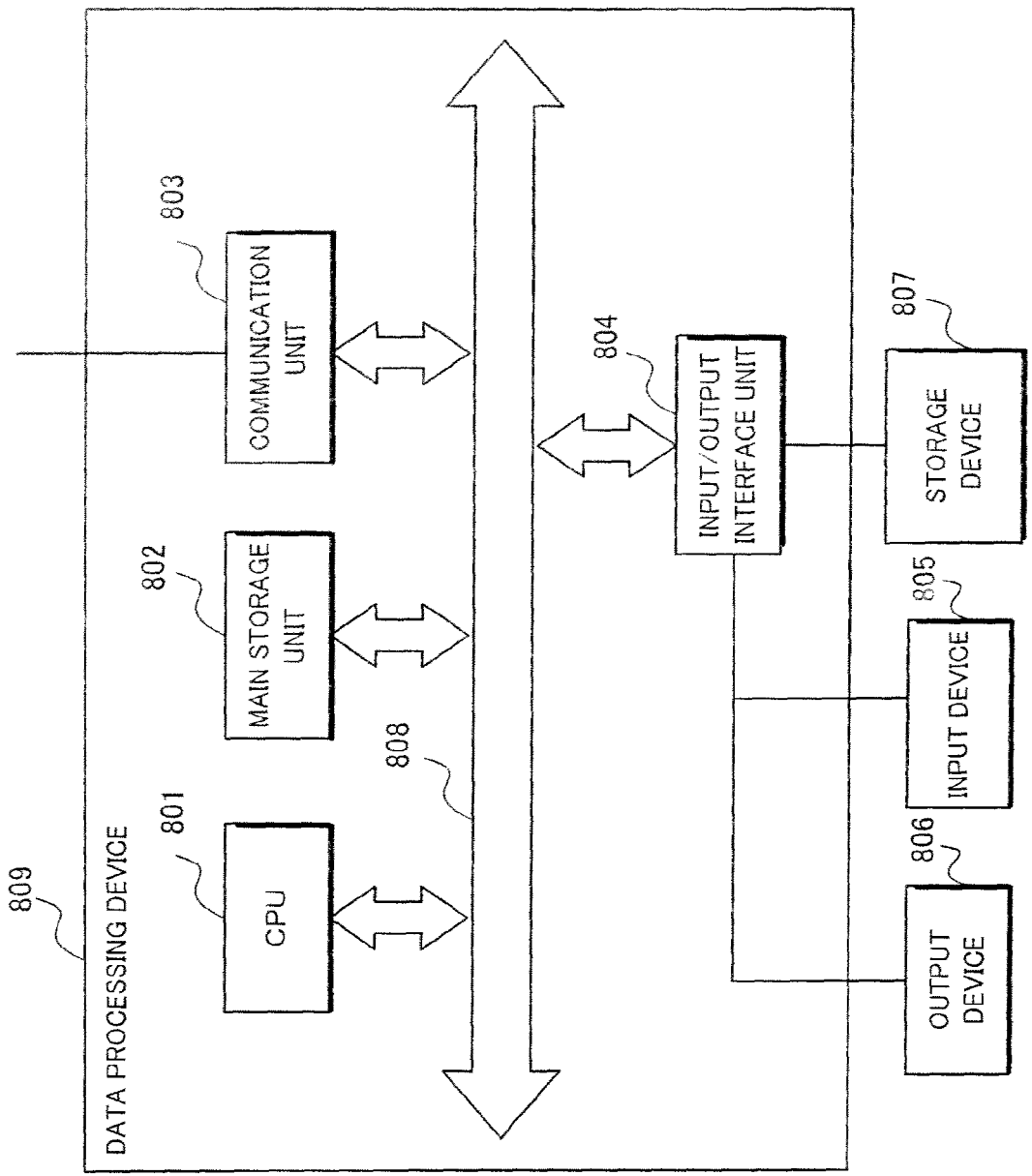
FIG. 10 is a block diagram showing an example of a hardware structure of an operation server and a designing server of the present invention.

Next, description will be made of a hardware structure example of the operation server 7 and the designing server 12 according to the present invention with reference to FIG. 10. FIG. 10 is a block diagram showing the hardware structure example of the operation server 7 and the designing server 12.

With reference to FIG. 10, the operation server 7 and the designing server 12, which have the same hardware structures as those of a common computer device, each comprises a CPU (Central Processing Unit) 801, a main storage unit 802 formed of a memory such as a RAM (Random Access Memory) for use as a data working region or a data temporary saving region, a communication unit 803 which transmits and receives data through a network, an input/output interface unit 804 connected to an input device 805, an output device 806 and a storage device 807 to transmit and receive data, and a system bus 808 which connects each of the above-described components with each other. The storage device 807 is realized by a hard disk device formed of a non-volatile memory, for example, a ROM (Read Only Memory), a magnetic disk, a semiconductor memory or the like.

The data processing device 8 of the operation server 7 and a data processing device 809 of the designing server 12 of the present invention have their operations realized not only in hardware by mounting a circuit part as a hardware part such as an LSI (Large Scale Integration) with a program incorporated but also in software by storing a program which provides their functions in the storage device 807, loading the program into the main storage unit 802 and executing the same by the CPU 801.

INCORPORATION BY REFERENCE

This application is based upon and claims the benefit of priority from Japanese patent application No. 2009-195507, filed on Aug. 26, 2009, the disclosure of which is incorporated herein in its entirety by reference.

INDUSTRIAL APPLICABILITY

The present invention is applicable to such use as providing service of delivering contents or applications from a plurality of server sites or data centers disposed in a geographically distributed manner on the Internet formed of numerous ASs each as a network operation unit.

The present invention is applicable not only to distribution of contents from an origin site to an edge site but also to application delivery of transferring a result of processing obtained by an application of the origin server to a Web client of an end user through one or a plurality of relay sites.

Although the present invention has been described with respect to the preferred exemplary embodiments in the foregoing, the present invention is not necessarily limited to the above-described exemplary embodiments but can be implemented in variation without departing from the scope of its technical idea.

What is claimed is:

1. A network operation method, comprising:
when, in a set of sites each having a usable network operation unit, a new site is added or an existing site withdraws, executing designing for determining a combination of network operation units, each one of which is to be used in each said added or withdrawn site, by selecting a candidate network operation unit from provided candidates of a plurality of network operation units such that at least a site which transmits or receives data becomes reachable based on a connection relationship between each paired said network operation units added or withdrawn; and
when a combination of said network operation units is determined in said designing, considering said network operation unit determined as a network operation unit to be newly used in each said site,
wherein a combination of said network operation units, each one of which is to be used by each site, is determined by creating a minimum spanning tree based on a cost applied between each paired said network operation units which are connected with each other and calculating a combination of said network operation units which minimizes a maximum value of said cost in said minimum spanning tree, and
wherein said combination of said network operation units is determined by further calculating a combination of said network operation units which maximizes a total number of connection relationships each of which is held between the network operation units.

2. The network operation method according to claim 1, wherein said combination of said network operation units is determined by further calculating a combination of said network operation units which minimizes a total sum of costs applied between each paired network operation units which are connected with each other.

3. A network operation method, comprising:
when, in a set of sites each having a usable network operation unit, a new site is added or an existing site withdraws, executing designing for determining a combination of network operation units, each one of which is to be used in each said added or withdrawn site, by selecting a candidate network operation unit from provided candidates of a plurality of network operation units such that at least a site which transmits or receives data becomes reachable based on a connection relationship between each paired said network operation units added or withdrawn; and
when a combination of said network operation units is determined in said designing, considering said network operation unit determined as a network operation unit to be newly used in each said site,
wherein said network operation unit each to be used in each site is determined every time a site is sequentially selected, a site to be newly selected is determined based on a Prim's algorithm and a network operation unit to be used in said site to be newly selected is determined based on a total number of connection relationships with a network operation unit of other site.

4. A network operation system, comprising:
a designing server which executes, when in a set of sites each having a usable network operation unit, a new site is added or an existing site withdraws, designing for determining a combination of network operation units, each one of which is to be used in each said added or withdrawn site, by selecting a candidate network operation unit from provided candidates of a plurality of network operation units such that at least a site which transmits or receives data becomes reachable based on a connection relationship between each paired said network operation units added or withdrawn; and
an operation server which considers, when a combination of said network operation units is determined in said designing, said network operation unit determined as a network operation unit to be newly used in each said site,
wherein said designing server determines a combination of said network operation units, each one of which is to be used by each site, by creating a minimum spanning tree based on a cost applied between each paired said network operation units which are connected with each other and calculating a combination of said network operation units which minimizes a maximum value of said cost in said minimum spanning tree, and
wherein said designing server determines said combination of said network operation units by further calculating a combination of said network operation units which maximizes a total number of connection relationships each of which is held between the network operation units.

5. The network operation system according to claim 4, wherein said designing server determines said combination of said network operation units by further calculating a combination of said network operation units which minimizes a total sum of costs applied between each paired network operation units which are connected with each other.

6. A network operation system, comprising:
a designing server which executes, when in a set of sites each having a usable network operation unit, a new site is added or an existing site withdraws, designing for determining a combination of network operation units, each one of which is to be used in each said added or withdrawn site, by selecting a candidate network operation unit from provided candidates of a plurality of network operation units such that at least a site which transmits or receives data becomes reachable based on a connection relationship between each paired said network operation units added or withdrawn; and
an operation server which considers, when a combination of said network operation units is determined in said designing, said network operation unit determined as a network operation unit to be newly used in each said site,
wherein said designing server determines said network operation unit each to be used by each site every time a site is sequentially selected, determines a site to be newly selected based on a Prim's algorithm and determines a network operation unit to be used in said site to be newly selected based on a total number of connection relationships with a network operation unit of other site.

7. A non-transitory computer-readable medium storing a program, wherein said program
causes a computer as a designing server to execute the processing of executing, when in a set of sites each having a usable network operation unit, a new site is added or an existing site withdraws, designing for determining a combination of the network operation units, each one of which is to be used by each said added or withdrawn site, by selecting a candidate network operation unit from provided candidates of a plurality of network operation units such that at least a site which transmits or receives data becomes reachable based on a connection relationship between each paired said network operation units added or withdrawn, and causes a computer as an operation server to execute the processing of considering, when a combination of said network operation units is determined in said designing, said network operation unit determined as a network operation unit to be newly used in each said site, wherein in said designing processing, a combination of said network operation units, each one of which is to be used by each site, is determined by creating a minimum spanning tree based on a cost applied between each paired said network operation units which are connected with each other and calculating a combination of said network operation units which minimizes a maximum value of said cost in said minimum spanning tree, and wherein in said designing processing, said combination of said network operation units is determined by further calculating a combination of said network operation units which maximizes a total number of connection relationships each of which is held between the network operation units.

8. The non-transitory computer-readable medium according to claim 7, wherein in said designing processing, said combination of said network operation units is determined by further calculating a combination of said network operation units which minimizes a total sum of costs applied between each paired network operation units which are connected with each other.

9. A non-transitory computer-readable medium storing a program, wherein said program causes a computer as a designing server to execute the processing of executing, when in a set of sites each having a usable network operation unit, a new site is added or an existing site withdraws, designing for determining a combination of the network operation units, each one of which is to be used by each said added or withdrawn site, by selecting a candidate network operation unit from provided candidates of a plurality of network operation units such that at least a site which transmits or receives data becomes reachable based on a connection relationship between each paired said network operation units added or withdrawn, and causes a computer as an operation server to execute the processing of considering, when a combination of said network operation units is determined in said designing, said network operation unit determined as a network operation unit to be newly used in each said site, wherein in said designing processing, said network operation unit each to be used by each site is determined every time a site is sequentially selected, a site to be newly selected is determined based on a Prim's algorithm and a network operation unit to be used in said site to be newly selected is determined based on a total number of connection relationships with a network operation unit of other site.

* * * * *